(12) United States Patent
Kim et al.

(10) Patent No.: US 11,949,153 B2
(45) Date of Patent: *Apr. 2, 2024

(54) ELECTRONIC DEVICE INCLUDING MULTIBAND ANTENNA

(71) Applicant: Samsung Electronics Co., Ltd., Suwon-si (KR)

(72) Inventors: Tae Young Kim, Suwon-si (KR); In Young Lee, Hwaseong-si (KR); Sang Hoon Choi, Suwon-si (KR); Woo Suk Kang, Seoul (KR); Jae Won Choe, Suwon-si (KR); Jae Bong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,128

(22) Filed: Oct. 14, 2022

(65) Prior Publication Data

US 2023/0043640 A1  Feb. 9, 2023

Related U.S. Application Data

(63) Continuation of application No. 17/678,336, filed on Feb. 23, 2022, now Pat. No. 11,476,569, which is a
(Continued)

(30) Foreign Application Priority Data

Aug. 13, 2015  (KR) .......................... 10-2015-0114945

(51) Int. Cl.
*H01Q 1/44* (2006.01)
*G04G 17/04* (2006.01)
(Continued)

(52) U.S. Cl.
CPC ............... *H01Q 1/44* (2013.01); *G04G 17/04* (2013.01); *G04G 17/08* (2013.01); *G04R 60/12* (2013.01);
(Continued)

(58) Field of Classification Search
CPC . H01Q 1/44; H01Q 7/00; H01Q 5/364; G06F 1/163; G06F 1/1698; G06F 17/08
See application file for complete search history.

(56) References Cited

U.S. PATENT DOCUMENTS 6,897,814 B2   5/2005  Iwai et al.
6,957,085 B2  10/2005  Shin et al.
(Continued)

FOREIGN PATENT DOCUMENTS

CN       1224133 C    10/2005
CN     103327726 A     9/2013
(Continued)

OTHER PUBLICATIONS

Extended European Search Report dated Aug. 1, 2018, issued in European Application No. 16835507.1.
(Continued)

*Primary Examiner* — Sherman Ng
(74) *Attorney, Agent, or Firm* — Jefferson IP Law, LLP

(57) ABSTRACT

An electronic device is provided. The electronic device includes an outer housing that comprises a first surface facing a first direction, a second surface facing a second direction opposite to the first direction, and a side surface surrounding a space between the first surface and the second surface, a display adapted to expose at least a portion of the display through the first surface of the outer housing, a PCB arranged between the second surface and the display in an interior of the outer housing, a communication circuit arranged on or over the PCB, a first conductive structure
(Continued)

formed of at least one of the first surface or at least a portion of the side surface is electrically connected to the communication circuit, and a second conductive structure formed of the portion of the display electrically connected to the first conductive structure.

20 Claims, 19 Drawing Sheets

Related U.S. Application Data continuation of application No. 17/351,634, filed on Jun. 18, 2021, now Pat. No. 11,276,921, which is a continuation of application No. 16/939,515, filed on Jul. 27, 2020, now Pat. No. 11,069,968, which is a continuation of application No. 16/448,759, filed on Jun. 21, 2019, now Pat. No. 10,727,576, which is a continuation of application No. 16/030,237, filed on Jul. 9, 2018, now Pat. No. 10,333,211, which is a continuation of application No. 15/235,801, filed on Aug. 12, 2016, now Pat. No. 10,020,572.

(51) Int. Cl.
| | |
|---|---|
| *G04G 17/08* | (2006.01) |
| *G04R 60/12* | (2013.01) |
| *G06F 1/16* | (2006.01) |
| *H01Q 1/27* | (2006.01) |
| *H01Q 1/48* | (2006.01) |
| *H01Q 5/364* | (2015.01) |
| *H01Q 7/00* | (2006.01) |

(52) U.S. Cl.
CPC ............ *G06F 1/163* (2013.01); *G06F 1/1698* (2013.01); *H01Q 1/273* (2013.01); *H01Q 1/48* (2013.01); *H01Q 5/364* (2015.01); *H01Q 7/00* (2013.01)

(56) References Cited

U.S. PATENT DOCUMENTS

| | | |
|---|---|---|
| 7,804,453 B2 | 9/2010 | Chiang et al. |
| 8,054,232 B2 | 11/2011 | Chiang et al. |
| 8,275,327 B2 | 9/2012 | Yi et al. |
| 8,345,414 B2 | 1/2013 | Mooring et al. |
| 8,836,587 B2 | 9/2014 | Darnell et al. |
| 9,196,952 B2 | 11/2015 | Tran et al. |
| 9,502,752 B2 | 11/2016 | Darnell et al. |
| 9,705,180 B2 | 7/2017 | Darnell et al. |
| 9,722,303 B2 | 8/2017 | Hsieh et al. |
| 9,819,778 B2 | 11/2017 | Nakano et al. |
| 10,234,161 B2 | 3/2019 | Adamik et al. |
| 10,480,805 B2 | 11/2019 | Mulhouse et al. |
| 2002/0061775 A1 | 5/2002 | Iwai et al. |
| 2002/0151328 A1 | 10/2002 | Shin et al. |
| 2006/0270472 A1 | 11/2006 | Chen et al. |
| 2007/0035454 A1* | 2/2007 | Zarnowitz ............ H01Q 21/30 343/702 |
| 2007/0109208 A1 | 5/2007 | Turner |
| 2008/0261667 A1* | 10/2008 | Lee ................ H01Q 9/285 455/575.7 |
| 2010/0112964 A1 | 5/2010 | Yi et al. |
| 2012/0075813 A1* | 3/2012 | Shinn .................. H05K 1/028 174/254 |
| 2012/0092822 A1 | 4/2012 | Mooring et al. |
| 2012/0105286 A1* | 5/2012 | Rhyu .................. H01Q 9/0421 343/702 |
| 2012/0229346 A1* | 9/2012 | Chen .................... H01Q 9/42 343/702 |
| 2013/0242519 A1 | 9/2013 | Gao et al. |
| 2013/0342411 A1 | 12/2013 | Jung et al. |
| 2014/0029213 A1* | 1/2014 | Kanj ................... H01Q 1/243 361/752 |
| 2014/0071022 A1* | 3/2014 | Na ...................... H01Q 5/371 343/904 |
| 2014/0262481 A1 | 9/2014 | Khoury et al. |
| 2014/0266920 A1* | 9/2014 | Tran .................... H01Q 1/243 343/702 |
| 2014/0268452 A1* | 9/2014 | Khoury ................ H05K 13/00 361/56 |
| 2014/0354494 A1 | 12/2014 | Katz |
| 2015/0048979 A1 | 2/2015 | Asrani et al. |
| 2015/0091764 A1 | 4/2015 | Hsieh et al. |
| 2015/0123857 A1 | 5/2015 | Park et al. |
| 2015/0207913 A1* | 7/2015 | Nakano ............ H04M 1/72412 455/552.1 |
| 2015/0220111 A1* | 8/2015 | McLaughlin ......... G06F 1/1641 345/173 |
| 2015/0349410 A1* | 12/2015 | Russell .................. G04G 21/04 29/601 |
| 2015/0365508 A1* | 12/2015 | Kwon ................... G06F 1/1658 455/566 |
| 2016/0064804 A1 | 3/2016 | Kim et al. |

FOREIGN PATENT DOCUMENTS

| | | |
|---|---|---|
| CN | 203589190 U | 5/2014 |
| CN | 102522623 B | 7/2015 |
| CN | 104756317 A | 7/2015 |
| KR | 10-2016-0026581 A | 3/2016 |

OTHER PUBLICATIONS

Chinese Office Action dated Nov. 15, 2019, issued in a counterpart Chinese Appl. No. 201680047098.3.
Indian Hearing Notice dated Jul. 31, 2023, issued in Indian Patent Application No. 201817000003.

* cited by examiner

ELECTRONIC DEVICE INCLUDING MULTIBAND ANTENNA

CROSS-REFERENCE TO RELATED APPLICATION(S)

This application is a continuation application of prior application Ser. No. 17/678,336, filed on Feb. 23, 2022, which will be issued as U.S. Pat. No. 11,476,569 on Oct. 18, 2022; which is a continuation application of prior application Ser. No. 17/351,634, filed on Jun. 18, 2021, which has issued as U.S. Pat. No. 11,276,921 on Mar. 15, 2022; which is a continuation application of prior application Ser. No. 16/939,515, filed on Jul. 27, 2020, which has issued as U.S. Pat. No. 11,069,968 on Jul. 20, 2021; which is a continuation application of prior application Ser. No. 16/448,759, filed on Jun. 21, 2019, which has issued as U.S. Pat. No. 10,727,576 on Jul. 28, 2020; which is a continuation of prior application Ser. No. 16/030,237, filed on Jul. 9, 2018, which has issued as U.S. Pat. No. 10,333,211 on Jun. 25, 2019; which is a continuation of U.S. patent application Ser. No. 15/235,801, filed on Aug. 12, 2016, which has issued as U.S. Pat. No. 10,020,572 on Jul. 10, 2018 and was based on and claimed under 35 U.S.C. § 119(a) of a Korean patent application filed on Aug. 13, 2015 in the Korean Intellectual Property Office and assigned Serial number 10-2015-0114945, the entire disclosure of which is hereby incorporated by reference.

TECHNICAL FIELD

The present disclosure relates to an electronic device that may transmit and receive signals through a multiband antenna. In particular, the disclosure relates to an electronic device that may transmit and receive signals through a multiband antenna by utilizing a conductive outer part of the electronic device as an antenna radiator and also utilizing peripheral metallic components such as a display as a ground area.

BACKGROUND

Due to the development of electronic devices such as smartphones and tablet personal computers (PCs), wearable devices have been increasingly used. Such a wearable device is equipped with a communication function to perform various functions such as voice communications, identification of messages, wireless payments.

The wearable device is compactly manufactured to have a small size such that it may be mounted to a part of a human body, and may have a limited mounting space. The wearable electronic device may be arranged such that various devices, modules, and antennas are mounted in a limited mounting space.

An electronic device such as a wearable device according to the related art has a large thickness and cannot be made in a small size when provided with various antennas for wireless Internet, wireless payments, or overseas roaming services.

When a metal component is present inside or outside the electronic device, a performance of the antenna may rapidly decrease due to a scattering effect or a trapping effect of electromagnetic fields by a metal. In order to prevent lowering of performance, a method of securing a sufficient spacing distance from a metal is applied, but the device may be excessively deformed, costs may increase due to an additional material, and the thickness of the electronic device may increase.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that may implement a multiband antenna by utilizing a conductive outer part of the electronic device as an antenna radiator and also utilizing peripheral metallic components such as a display as a ground area.

In accordance with an aspect of the present disclosure, an electronic device is provided. The electronic device includes an outer housing that comprises a first surface facing a first direction, a second surface facing a second direction opposite to the first direction, and a side surface surrounding a space between the first surface and the second surface, a display adapted to expose at least a portion of the display through the first surface of the outer housing, a PCB arranged between the second surface and the display in an interior of the outer housing, a communication circuit arranged on or over the PCB, a first conductive structure formed of at least one of the first surface or at least a portion of the side surface is electrically connected to the communication circuit, and a second conductive structure formed of the portion of the display electrically connected to the first conductive structure.

In accordance with an aspect of the present disclosure, an electronic device is provided. An electronic device includes an outer housing having a first conductive structure, a display adapted to expose at least a portion of the display through a first surface of the outer housing; and a printed circuit board (PCB) electrically connected to the display, where the first conductive structure includes a feeding connector connected to a feeder of the PCB, and at least one ground connector that is connected to a ground part of the PCB or a ground part of the display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
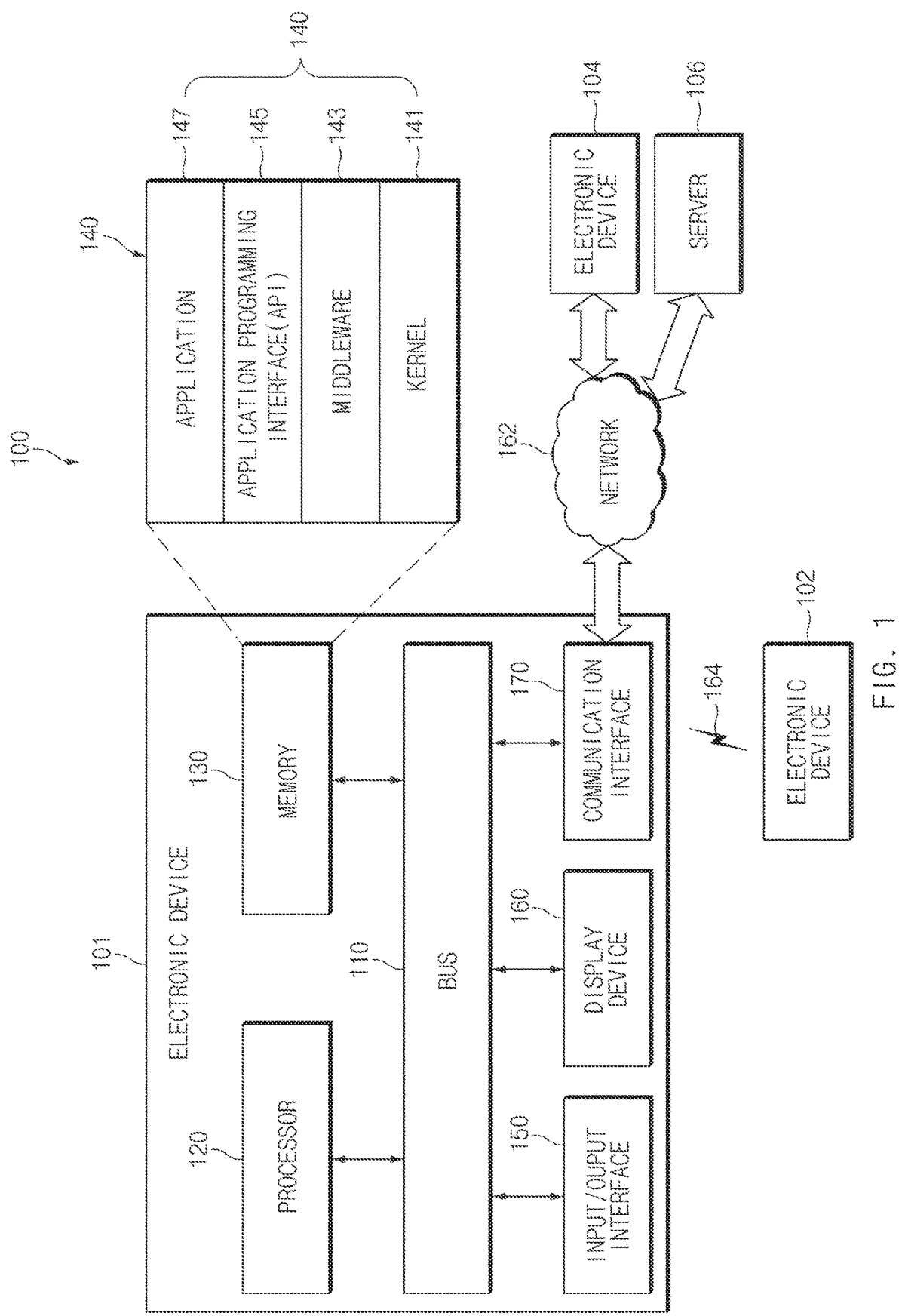
FIG. 1 illustrates an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. Central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group (MPEG-1 or MPEG-2) audio layer 3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disc (DVD) player, an audio, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device in a network environment according to an embodiment of the present disclosure.

Referring to FIG. 1, there is illustrated an electronic device 101 in a network environment 100 according to various embodiments. The electronic device 101 may include a bus 110, a processor 120, a memory 130, an input/output (I/O) interface 150, a display 160, and a communication interface 170. According to an embodiment, the electronic device 101 may not include at least one of the above-described elements or may further include another element(s).

For example, the bus 110 may interconnect the above-described elements 120 to 170 and may include a circuit for conveying communications (e.g., a control message and/or data) among the above-described elements.

The processor 120 may include one or more of a CPU, an AP, or a communication processor (CP). The processor 120 may perform, for example, data processing or an operation associated with control and/or communication of at least one other element(s) of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to another element(s) of the electronic device 101. Furthermore, the I/O interface 150 may output an instruction or data, received from another element(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various kinds of content (e.g., a text, an image, a video, an icon, a symbol, and the like) to a user. The display 160 may include a touch screen and may receive, for example, a touch, gesture, proximity, or hovering input using an electronic pen or a portion of a user's body.

According to various embodiments, a display device 160 may have a conductive structure at a portion thereof. The conductive structure may be connected to a printed circuit board (PCB) or connected to an outer metal housing of the electronic device to be used as a part of an antenna.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

The wireless communication may include at least one of, for example, long-term evolution (LTE), LTE advance (LTE-A), code division multiple access (CDMA), wideband CDMA (WCDMA), universal mobile telecommunications system (UMTS), wireless broadband (WiBro), or global system for mobile communications (GSM), or the like, as cellular communication protocol. Furthermore, the wireless communication may include, for example, a local area network 164. The local area network 164 may include at least one of a Wi-Fi, a near field communication (NFC), or a GNSS, or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., local area network (LAN) or wide area network (WAN)), an Internet, or a telephone network.

According to various embodiments, a communication interface 170 may include various antennas for wireless communications. The antenna may have various resonance characteristics according to the length and form of a radiator, a connection location of a feeder and a ground part, an arrangement form of a peripheral conductive material, and the like. An outer housing of an electronic device 101, which includes a metallic material, may be used as the radiator of the antenna.

According to various embodiments, the communication interface 170 may include a communication circuit and a control circuit connected to the antenna. The communication circuit and the control circuit may be mounted on a PCB.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic devices 102 and 104 or the server 106). According to an embodiment, in the case where the electronic device 101 executes any function or service automatically or in response to a request, the electronic device 101 may not perform the function or the service internally, it may, alternatively or additionally, request another device (e.g., the electronic device 102 or 104 or the server 106) to perform. The another electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
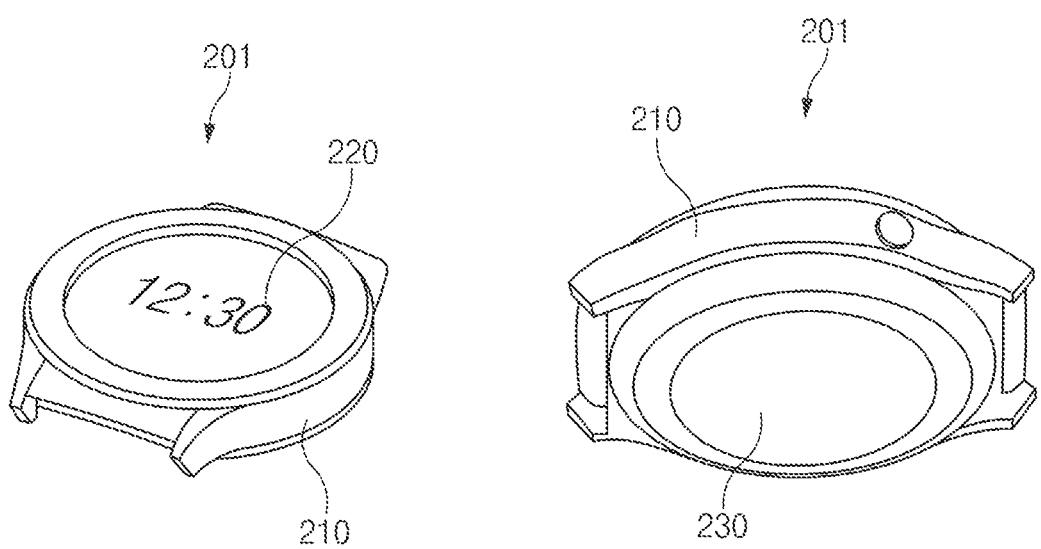
FIG. 2 illustrates a perspective view of an electronic device according to an embodiment of the present disclosure.

FIG. 2 illustrates a perspective view of an electronic device according to an embodiment of the present disclosure.

Referring to FIG. 2, although an electronic device 201 of a watch type wearable electronic device is illustrated, the present disclosure is not limited thereto. In various embodiments, the electronic device 201 may be the electronic device 101 of FIG. 1. the electronic device 201 may include an outer housing 210, a display 220, and a rear cover 230.

The outer housing 210 according to various embodiments may have a through-hole of a specific size at the center of a first surface (hereinafter, a front surface) to define an opening. The size of the through-hole may determine a size by which the display 220 is exposed. As another example, the outer housing 210 may include a peripheral part that defines a through-hole and a side wall that surrounds the through-hole in a direction is perpendicular to the peripheral part or forms a specific angle with the peripheral part. As another example, the outer housing 210 may protect various configurations (for example, a display, a battery, and a PCB) arranged inside the outer housing 210. Although FIG. 2 illustrates that the through-hole is circular, the present disclosure is not limited thereto.

The outer housing 210 according to various embodiments may be coupled to the rear cover 230. A button or a stem may be additionally mounted on one side of the outer housing 210, and a binding structure (not illustrated) that may be attached to or detached from the body of the user may be further provided. The binding structure, for example, may be implemented by two band shapes connected to opposite sides of a periphery of the outer housing 210.

According to various embodiments, at least a portion of the outer housing 210 may be implemented by a conductive material (for example, a metal) In this case, at least a portion (hereinafter, a first conductive structure) of the outer housing 210 may be used as an antenna radiator for transmitting and receiving data to and from an external device. For example, the first conductive structure may be used as an antenna of a mobile communication module such as $2^{nd}$ generation (2G), $3^{rd}$ generation (3G), or $4^{th}$ generation (4G). Further, the first conductive structure may be used as an antenna of a GPS communication module, a Wi-Fi communication module, an NFC communication module, or a Bluetooth (BT) communication module.

The first conductive structure according to various embodiments may be formed in the entire outer housing 210 or an area of the outer housing 210. For example, the first conductive structure may be formed at a periphery of the through-hole through which the display 220 is exposed. As another example, the first conductive structure may be formed on a side wall of the outer housing 210.

The first conductive structure according to various embodiments may have a feeding connector and various ground connectors. The feeding connector and the ground connectors may be connected to a PCB or various conductive structures in the interior of the electronic device 201.

Information on a manner in which the first conductive structure is operated as an antenna radiator may be provided through FIGS. 2 to 3, 4A, 4B, 5A to 5D, 6A to 6E, 7A, 7B, 8, 9, and 10.

At least a portion of the display 220 according to various embodiments may be exposed to the outside through the through-hole of the outer housing 210. The exposed display 220 may have a form (for example, a circular form) corresponding to the shape of the through-hole. The display 220 may include an area that is exposed through the through-hole and an area that is seated inside the outer housing 210. A separate glass member may be attached to an area that is exposed through the through-hole. As another example, the display 220 may include a display panel (for example, an LCD panel or an OLED panel) that displays an image or a text and a panel (for example, a touch panel) that receives an input of the user. In various embodiments, the display 220 may be implemented by a one cell TSTP AMOLED (OCTA) in which a touch panel and an active matrix OLED (AMOLED) panel are integrally coupled to each other.

According to various embodiments, the display 220 may include a second conductive structure that is implemented by a conductive material (for example, a metal). For example, the second conductive structure may be formed on a flexible printed circuit board (FPCB) included in the display 220, or may be formed in a separate shielding layer or a separate heat dissipating layer.

The second conductive structure according to various embodiments may be electrically connected to the first conductive structure included in the outer housing 210 or the PCB to be utilized as a part of an antenna. In various embodiments, the second conductive structure may include a plurality of conductive plates.

The rear cover 230 according to various embodiments may be coupled to the outer housing 210 to fix and protect an internal configuration. The rear cover 230 may be a non-metallic material or a non-conductive material. The rear cover 230 may prevent the outer housing 210 from contacting skin of the user and the like.

Figure 3:
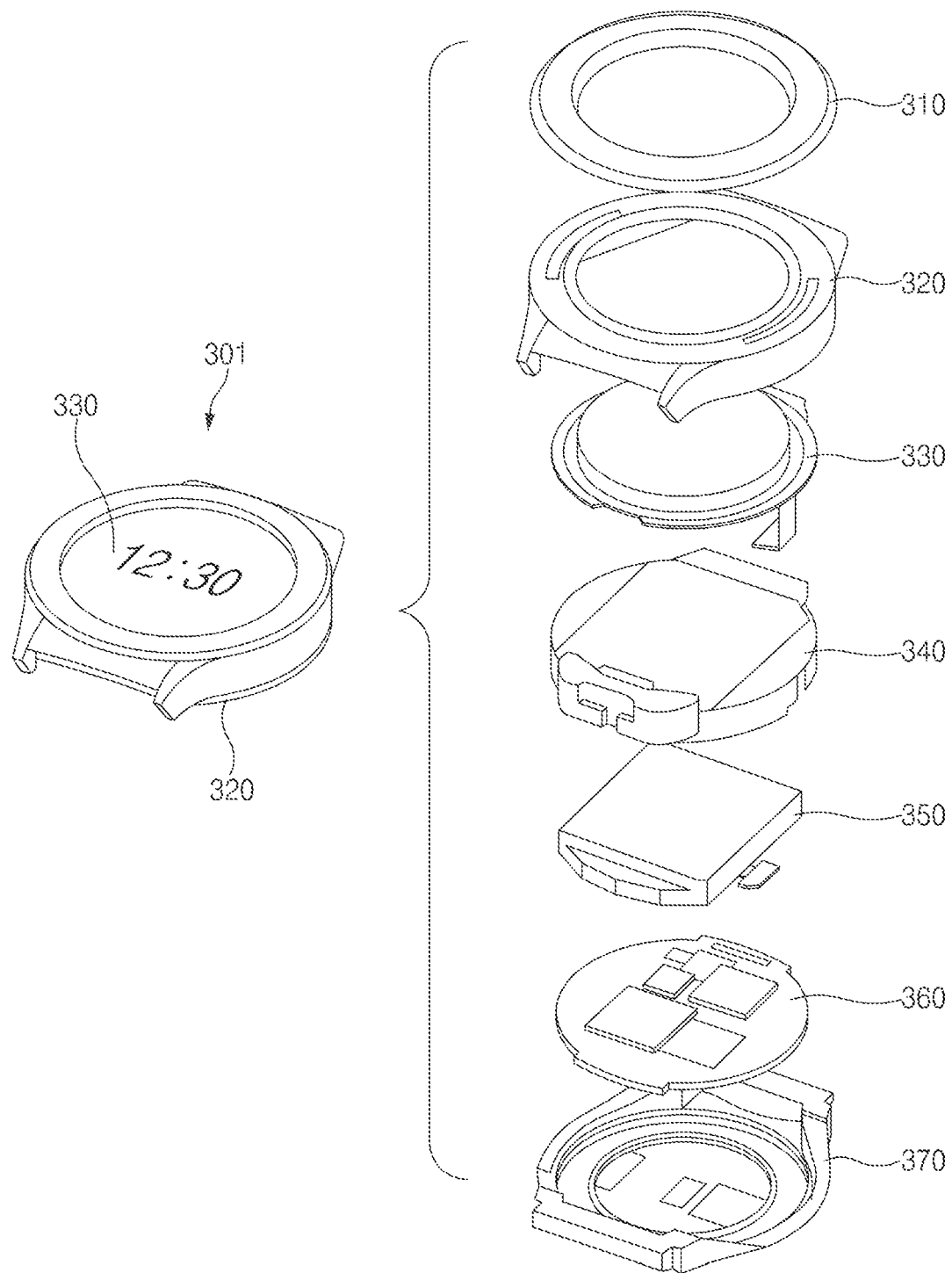
FIG. 3 illustrates a development view of an electronic device according to an embodiment of the present disclosure.

FIG. 3 illustrates a development view of an electronic device according to an embodiment of the present disclosure.

Referring to FIG. 3, an electronic device 301 may be the electronic device 101 of FIG. 1. The electronic device 301 may include an outer housing 320, a display 330, a bracket 340, a battery 350, a PCB 360, and a rear cover 370.

The outer housing 320 according to various embodiments may protect various configurations (for example, the display 330, the battery 340, and the PCB 360) arranged inside the outer housing 320. In various embodiments, the outer housing 320 may include a bezel wheel 310 arranged at a periphery of a through-hole through which the display 330 is exposed. The bezel wheel 310 may an area of the display 330 under the bezel wheel from being exposed to the outside, and may generate a user input through rotation.

According to various embodiments, at least a portion of the outer housing 320 may include a first conductive structure implemented by a conductive material (for example, a metal). For example, the first conductive structure may be formed at an upper portion of the display 330 (a periphery of the through-hole or a periphery of the bezel wheel 310), or may be formed at a portion of the same or similar height of the display 330 (for example, a side wall of the outer housing 320). Depending on a location of the first conductive structure according to various embodiments, characteristics of a corresponding resonance frequency may vary.

The display 330 according to various embodiments may have a plate shape that has a specific thickness as a whole, and may output an image or a text. As another example, at least a portion of the display 330 may be exposed through a first surface of the outer housing that faces a first direction. The display 330 according to various embodiments, for example, may be implemented in various types such as an LCD type, an OLED type, and an OCTA type. When the display 330 according to various embodiments includes a touch panel, the display 330 may receive a touch input of the user and provide the received touch input to a processor mounted on the PCB 360.

According to various embodiments, a conductive structure (for example, an FPCB, a shielding layer, or a heat radiating layer) of the display 330 may be connected to a ground part of the PCB 360 to ensure a performance of an antenna. For example, a tail-shaped pattern may be withdrawn from the FPCB of the display 330, and the tail may be seated on the bracket 340 and be connected to one surface of the PCB 360. According to various embodiments, a connection of a conductive structure of the display 330 and a ground part of the PCB 360 can prevent the display 330 from being operated as an interruption factor to transmission and reception of electric waves.

According to various embodiments, the display 330 may include a second conductive structure that is implemented by a conductive material (for example, a metal). For example, the second conductive structure may be formed on a FPCB included in the display 330, or may be formed in a separate shielding layer or a separate heat dissipating layer. The second conductive structure according to various embodiments may be connected to the first conductive structure of the outer housing 320 or the PCB 360 to constitute a part of an antenna.

According to various embodiments, the display 330 may include a first area in which a screen is displayed and a second area in which a screen is not displayed, and the second conductive structure may be arranged in the second area.

According to various embodiments, the display 330 may have a stack structure including a touch panel, a display panel, a bonding layer, a ground layer, and an FPCB. Information on the stack structure of the display 330 according to various embodiments may be provided through FIG. 7A. In various embodiments, an NFC antenna (or an NFC coil) may be arranged inside the display 330.

The display 330 according to various embodiments may include signal lines for transmitting and receiving data to and from the PCB 360. A signal line related to supply of signals of the display panel (for example, an FPCB), a signal line related to supply of signals of the touch panel, a signal line for transmitting and receiving NFC signals, a signal line for grounding, and the like may be arranged in the display 330 while protruding. The electronic device 301 according to various embodiments may include a first electrical path that electrically connects a first conductive structure of the outer housing 320 and a second conductive structure of the display 330.

The bracket 340 according to various embodiments may mount and fix the display 330, the battery 350, the PCB 360, and the like. The bracket 340 may mount and fix signal lines connecting the configurations. The bracket 340 may be implemented by a non-conductive material (for example, a plastic).

The battery 350 according to various embodiments may be mounted on the bracket 340, and may be electrically connected to the PCB 360. The battery 350 may be charged by an external power source, and may emit the charged power to supply electric power for an operation of the electronic device 301.

Modules or chips for driving the electronic device 301 may be included in the PCB 360 according to various embodiments. A processor, a memory, a communication module, and the like may be mounted on the PCB 360. In various embodiments, the PCB 360 may include a feeder that may supply electric power to the antenna radiator. According to various embodiments, a ground member is arranged at a portion of the PCB 360, and the electronic device 301 may include a second electrical path that electrically connects the second conductive structure and the ground member.

The feeder according to various embodiments may be connected to the first conductive structure of the outer housing 320. In this case, the first conductive structure may be operated as an antenna radiator, and may receive electric power from the PCB 360.

According to various embodiments, the PCB 360 may include a ground part. The ground part may be connected to a conductive structure (for example, an FPCB, a shielding layer, or a heat dissipating layer) of the display 330. According to various embodiments, the ground part of the PCB 360 may be connected to the first conductive structure included in the outer housing 320.

The rear cover 370 according to various embodiments may be coupled to the outer housing 320 to fix and protect an internal configuration. The rear cover 370 may be a non-metallic material or a non-conductive material.

Figure 4A:
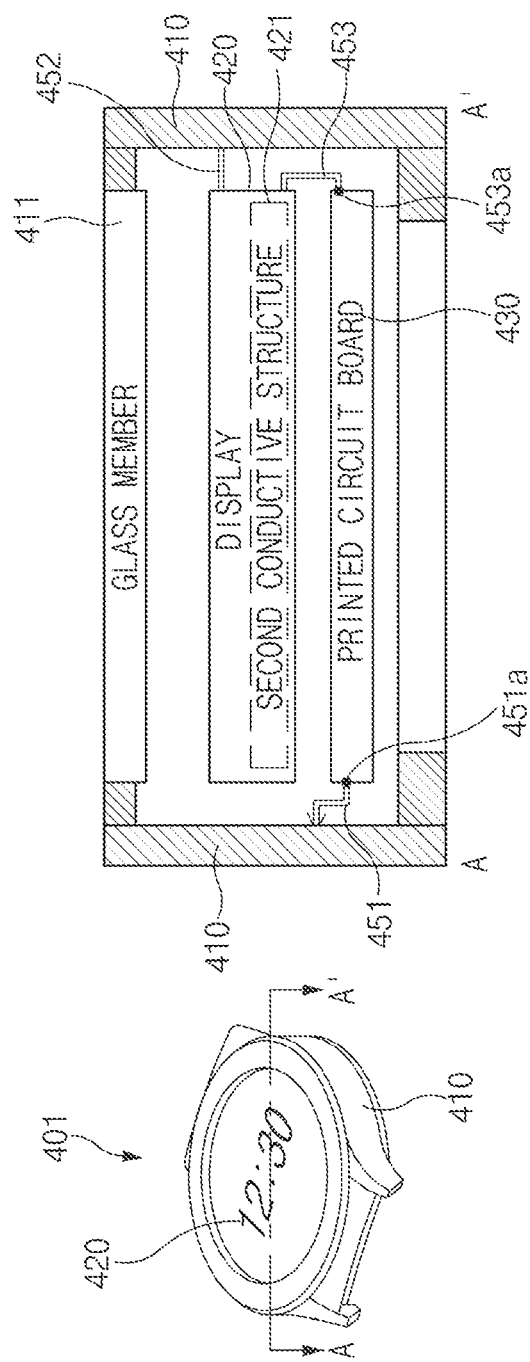
FIG. 4A illustrates a sectional view of an electronic device according to an embodiment of the present disclosure.

FIG. 4A illustrates a sectional view of an electronic device according to an embodiment of the present disclosure.

Referring to FIG. 4A, the sectional view schematically illustrates main elements related to an operation of an antenna, and additional configurations may be provided in the sectional view. In various embodiments, an electronic device 401 may be the electronic device 101 of FIG. 1. The electronic device 401 may include an outer housing 410, a display 420, and a PCB 430. The outer housing 410 may protect various configurations (for example, the display 420 and the PCB 430) arranged inside the outer housing 410. The outer housing 410 according to various embodiments may have a through-hole of a specific size at the center of a first surface (a front surface) to define an opening. A glass member 411 may be arranged in the through-hole according to various embodiments. The glass member 411 according to various embodiments may prevent the display 420 from being directly exposed to the outside, and may protect the display 420. In various embodiments, the glass member 411 may be directly bonded to the display 420.

According to various embodiments, at least a portion of the outer housing 410 may include a first conductive structure implemented by a conductive material (for example, metal). For example, the first conductive structure may be arranged at a periphery of the through-hole at an upper end of the display 420 (an area adjacent to the glass member 411), and may be formed at a part of a height that is the same as or similar to that of the display 420 (for example, a side wall of the outer housing 410). Depending on a location of the first conductive structure according to various embodiments, characteristics of a corresponding resonance frequency may vary.

According to various embodiments, the outer housing 410 may include a first surface that faces a first direction (for example, a surface through which the display 420 is exposed or a surface to which the glass 411 is attached), a second surface that faces a second direction opposite to the first direction, and a side surface that surrounds a space between the first surface and the second surface. A first conductive structure may be formed at least at a portion of the first surface and/or the side surface.

When the outer housing 410 according to various embodiments is utilized as an antenna radiator, the outer housing 410 may be connected to a communication circuit mounted on the PCB 430 seated inside the outer housing 410 to transmit and receive signals. The size, shape, and curving of the outer housing 410 according to various embodiments may be modified in various forms according to communication characteristics of the communication module. The outer housing 410 according to various embodiments may define an electrical path together with a feeder 451a of the PCB 430 through the first conductive member 451. The first conductive member 451 may be implemented by a C-clip or an FPCB.

The outer housing 410 according to various embodiments may be connected to a ground part 453a (or a ground area) formed in the display 420 or the PCB 430 through at least one conductive member (for example, the second conductive member 452). According to various embodiments, although FIG. 4A illustrates that the second conductive member 452 is connected to the ground area of the display 420, the present disclosure is not limited thereto. For example, the second conductive member 452 may be connected to the ground part of the second conductive structure 421 and the outer housing 410 therebetween.

The first conductive member 451 or the second conductive member 452 according to various embodiments may be implemented by a metal plate having contact parts at opposite ends thereof. As another example, the contact parts may be bent in a resilient form. As another example, the first conductive member 451 and the second conductive member 452 may prevent deterioration of performance due to a tolerance or a deformation by an external impact.

The display 420 according to various embodiments may output an image or a text. The display 420 may be implemented to have a protruding round disk shape. Signal lines (for example, signal lines for the touch screen and signal lines for the display panel) related to driving of the display 420 may be connected to one side of the display 420 according to various embodiments. The signal lines may be electrically connected to the PCB 430.

According to various embodiments, the display 420 may include a second conductive structure 421. For example, the second conductive structure 421 may be arranged at least at a portion of the FPCB of the display 420.

According to various embodiments, the display 420 may include a first area in which a screen is displayed and a second area in which a screen is not displayed, and the second conductive structure 421 may be arranged in the second area.

According to various embodiments, the second conductive structure 421 of the display 420 may define an electrical path (hereinafter, a first electrical path) together with the first conductive structure of the outer housing 410 through the second conductive member 452. Through this, the second conductive structure 421 of the display 420 may be operated as a part of a multiband antenna.

According to various embodiments, the second conductive structure 421 (for example, an FPCB, a shielding layer, or a heat dissipating layer) of the display 420 may define an electrical path (hereinafter, a second electrical path) together with a ground part (or a ground member) of the PCB 430 through the third conductive member 453. For example, a tail-shaped pattern may be withdrawn from the second conductive structure 421 of the display 420, and the tail may be seated on the bracket and be connected to a ground part formed on one surface of the PCB 430. According to various embodiments, a connection of the second conductive structure 421 of the display 420 and a ground part of the PCB 430 can prevent the display 420 from being operated as an interruption factor to transmission and reception of electric waves.

According to various embodiments, the electronic device 401 may include a communication circuit and a control circuit in the PCB 430, and the control circuit may transmit and receive a signal of a first frequency band to and from an external device by using the communication circuit and the first electrical path and may transmit and receive a signal of a second frequency band to and from an external device by using the communication circuit and the second electrical path.

Modules (for example, a communication module) or chips for driving the electronic device 401 may be included in the PCB 430 according to various embodiments. For example, the PCB 430 may include a feeder that may transfer a communication signal to an antenna radiator. The feeder according to various embodiments may be connected to the outer housing 410 through the first conductive member 451.

According to various embodiments, the PCB 430 may include a ground part 453*a*. In various embodiments, the ground part 453*a* of the PCB 430 may be connected to the second conductive structure 421 of the display 420 through the third conductive member 453. A connection of the second conductive structure 421 of the display 420 and a ground part 453*a* of the PCB 430 can prevent the display 420 from being operated as an interruption factor to transmission and reception of electric waves.

According to various embodiments, the outer housing 410 may be connected to a ground area through a plurality of conductive members. For example, all of the plurality of conductive members may be connected to a ground area of the display 420 (see FIG. 5C). As another example, all of the plurality of conductive members may be connected to a ground part of the PCB 430 (see FIGS. 5A and 5B). As another example, some of the plurality of conductive members may be connected to a ground area of the display 420, and some of the plurality of conductive members may be connected to a ground part of the PCB 430.

Figure 4B:
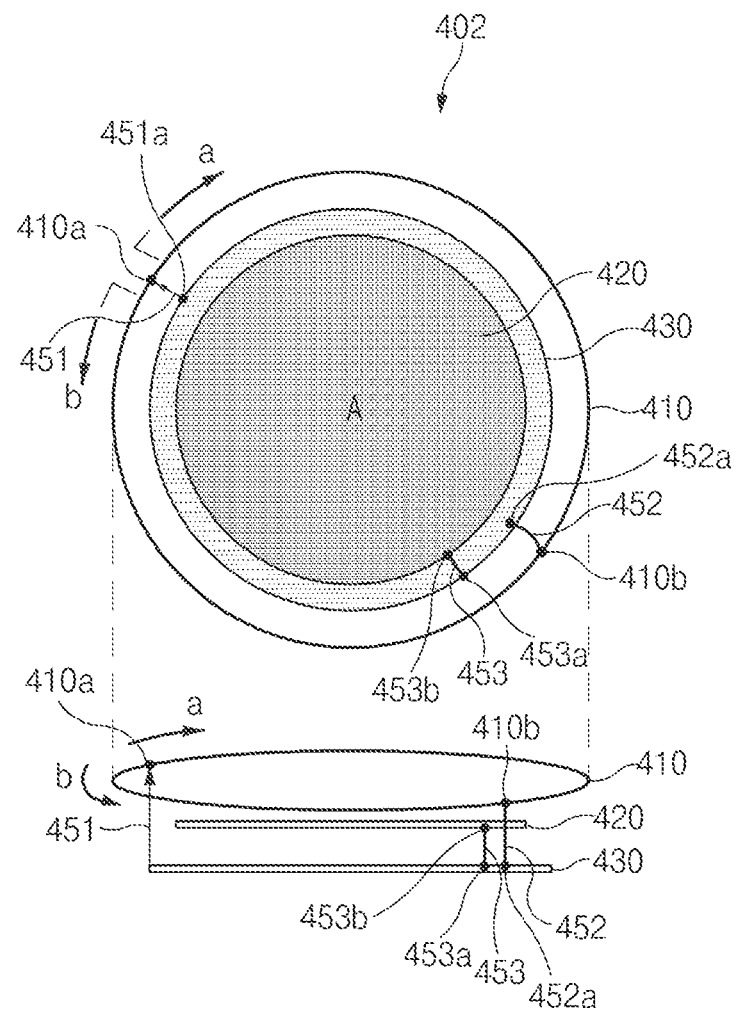
FIG. 4B is a diagram of an electronic device according to an embodiment of the present disclosure.
Figure 4B:
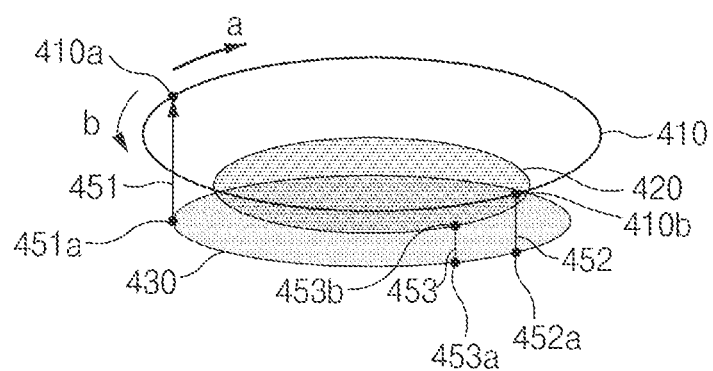

FIG. 4B is a diagram of an electronic device according to an embodiment of the present disclosure.

Referring to FIG. 4B, an electronic device 402 may be the electronic device 101 of FIG. 1. The electronic device 402 may transmit and receive a multiband frequency signal by using at least some of an outer housing 410, a display 420, and a PCB 430.

The outer housing 410 (or the first conductive structure included in the outer housing 410 hereinafter) according to various embodiments may surround the display 420 and the PCB 430. When the electronic device 402 is viewed from a front surface (surface A) through which the display 420 is exposed to the outside, the PCB 430 may be arranged under the display 420.

The outer housing 410 according to various embodiments may include a first point (a feeding connector) 410*a* connected to a feeder 451*a* of the PCB 430. The outer housing 410 may be connected to the feeder 451*a* of the PCB 430 through the first conductive member 451 at the first point 410*a*. In various embodiments, the first conductive member 451 may be generally formed of a metal, and may include a resilient structure in a region thereof. For example, the first conductive member 451 may have resiliency in two or more directions. A first end of the first conductive member 451 according to various embodiments may contact the outer housing 410, and a second end of the first conductive member 451 may contact the feeder 451*a* of the PCB 430.

The outer housing 410 according to various embodiments may include a second point (a ground connector) 410*b* that is connected to the ground part 452*a* (a fourth electrical path). At the second point 410*b*, the outer housing 410 may be connected to the ground part 452*a* through the second conductive member 452. Although FIG. 4B illustrates that the second point 410*b* is connected to the ground part 452*a* of the PCB 430, the present disclosure is not limited thereto. For example, the second point 410*b* may be connected to a ground area of the display 410. In various embodiments, the second conductive member 452 may have a material or form that is the same as or similar to that of the first conductive member 451.

The housing 410 according to various embodiments may be operated as at least a portion of a radiator of a multiband antenna. For example, the outer housing 410 may form resonances in direction a and direction b at the first point 410*a*. The electronic device 402 may generate a multi-loop resonance by using one feeder and one ground part.

A first route may be formed at the first point 410*a* of the electronic device 402 along direction a to form a resonance. If a distance from the first point 410*a* to the second point 410*b* in direction a becomes larger, a frequency signal of a relatively low frequency band may be transmitted and received, and if the distance becomes smaller, a frequency signal of a relatively high frequency band may be transmitted and received.

A second route may be formed at the first point 410*a* of the electronic device 402 along direction b to form a resonance. If a distance from the first point 410*a* to the second point 410*b* in direction b becomes larger, a frequency signal of a relatively low frequency band may be transmitted and received, and if the distance becomes smaller, a frequency signal of a relatively high frequency band may be transmitted and received.

The display 420 according to various embodiments may be connected to the ground part 453*a* of the PCB 430 through the third conductive member 453 (a second electrical path) and a ground point 453*b* of the display 520. The connection may prevent the adjacent display 420 from acting as an electric wave interrupting factor in an operation of transmitting and receiving a signal to and from the PCB 430.

In various embodiments, at least a portion of an FPCB of the display 420 may be used as a ground area (or a ground member). For example, the FPCB of the display 420 may be connected to the ground part 453*a* of the PCB 430. In this case, the third conductive member 453 may be withdrawn from an FPCB, on which components of the display 420 are mounted, in a tail form. The third conductive member 453 may be seated on the bracket, and may contact the ground part 453*a* formed on one surface of the PCB 430.

Figure 5A:
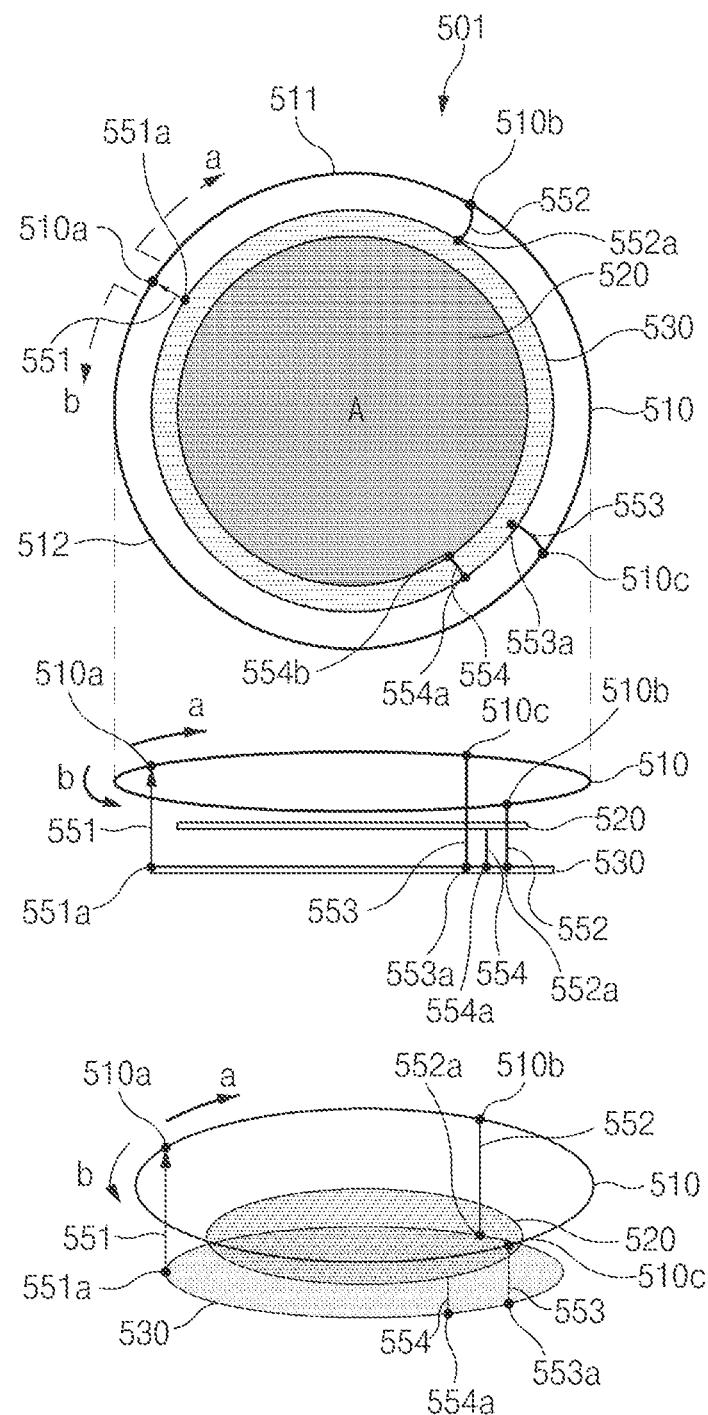
FIGS. 5A to 5C are diagrams of electronic devices according to various embodiments of the present disclosure.
Figure 5B:
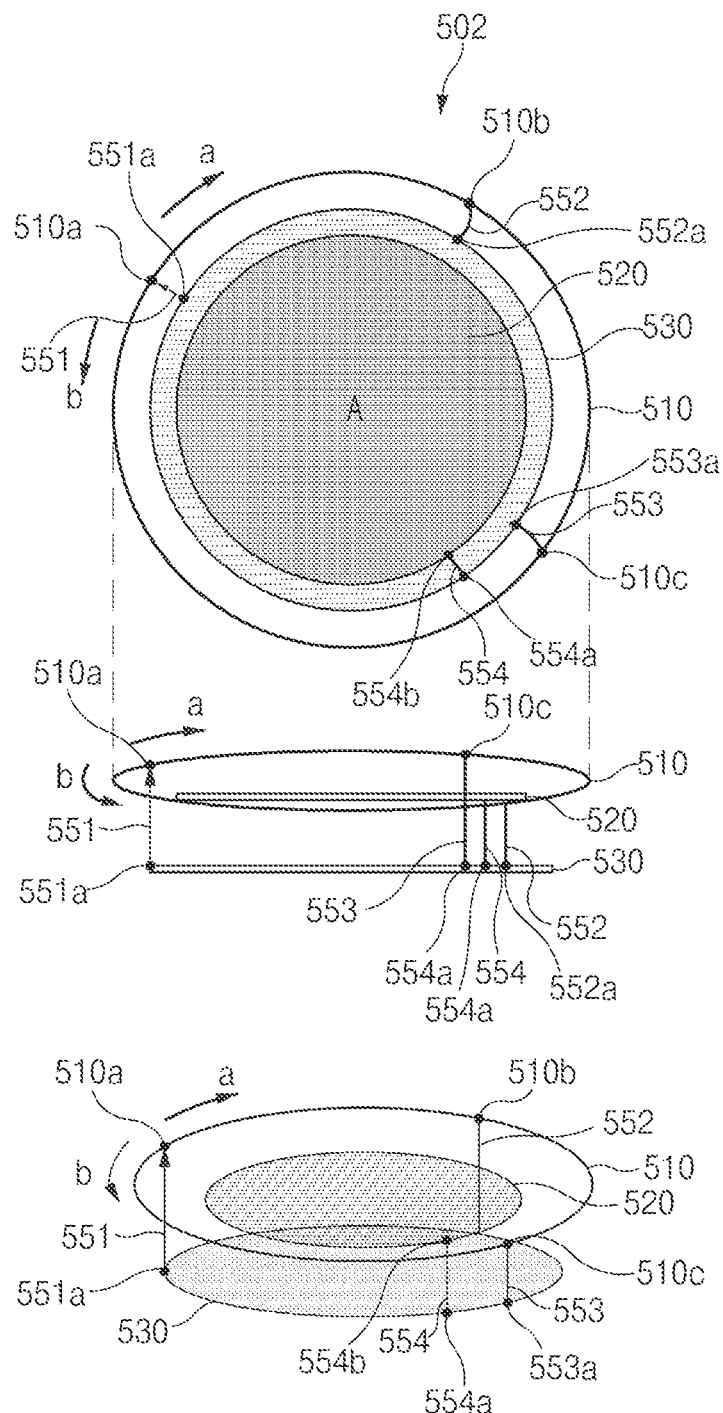
Figure 5C:
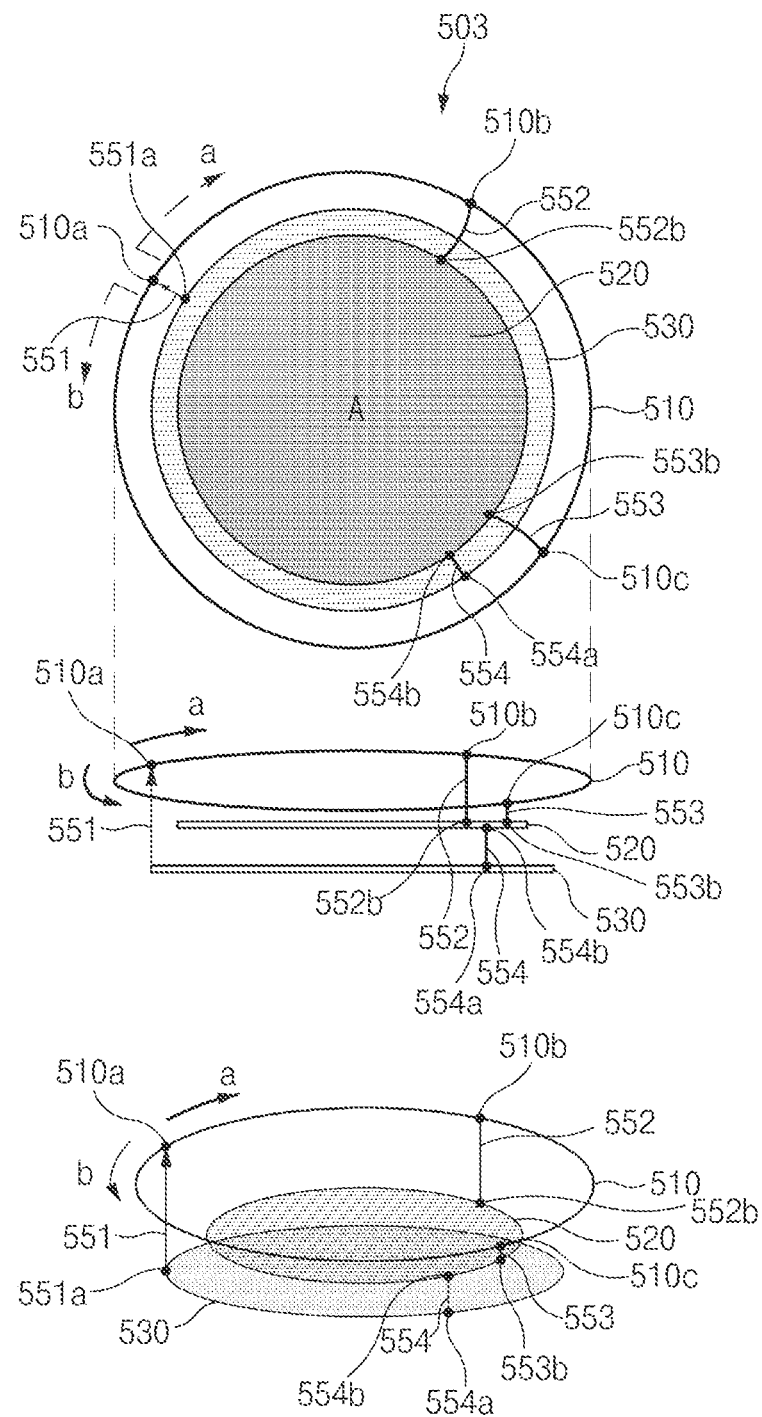

FIGS. 5A, 5B, and 5C are diagrams of electronic devices according to various embodiments of the present disclosure.

Electronic devices 501 to 503 of FIGS. 5A, 5B, and 5C schematically illustrate the electronic device 101, and the present disclosure is not limited thereto. Although FIGS. 5A, 5B, and 5C illustrate that a display 520 has an area that is smaller than that of a PCB 530, for convenience of description, the present disclosure is not limited thereto. For example, the display 520 may have a form or size that is the same as or similar to that of the PCB 530. As another example, although FIGS. 5A, 5B, and 5C illustrate that an outer housing 510 has a specific interval with the display 520 or the PCB 530, the outer housing 510 may be arranged close to the display 520 or the PCB 530, or may be attached to the display 520 or the PCB 530.

Referring to FIG. 5A, an electronic device 501 may transmit and receive a multiband frequency signal by using at least some of an outer housing 510, a display 520, and a PCB 530.

The outer housing 510 (or the first conductive structure included in the outer housing 510 hereinafter) according to various embodiments may surround the display 520 and the PCB 530. In various embodiments, the first conductive structure (a conductive material part of the outer housing 510) may be arranged on the upper side of the display 520 and the PCB 530 towards a front surface (in a direction towards A) of the electronic device 501.

According to various embodiments, when the electronic device 501 is viewed from a front surface (surface A) through which the display 520 is exposed to the outside, the PCB 530 may be arranged under the display 520.

According to various embodiments, the outer housing 510 may be connected to the feeder 551a of the PCB 530 through the first conductive member 551 at the first point (the feeding connector) 510a.

According to various embodiments, the outer housing 510 may include a plurality of ground connectors (for example, the second point 510b and the third point 510c) connected to the ground part. The second point 510b may be connected to the ground part 552a of the PCB 530 through the second conductive member 552 (a fourth electrical path). The third point 510c may be connected to the ground part 553a of the PCB 530 through the third conductive member 553 (a fourth electrical path). In various embodiments, the second conductive member 552 and the third conductive member 553 may have a material or form that is the same as or similar to that of the first conductive member 551.

According to various embodiments, a first route may be formed at the first point 510a of the electronic device 501 along direction a to form a resonance. If a distance between the first point 510a and the second point 520b in direction a becomes longer, a frequency signal of a relatively low frequency band may be transmitted and received. As another example, if the distance is shorter, a frequency single of a relatively high frequency band may be transmitted and received. According to various embodiments, in the electronic device 501, the length of a first route (a route that, starting from a feeding point 551a of the PCB 530, includes a first conductive member 551, a radiator 511 of the outer housing 510, a second point 510b, a second conductive member 552, and a ground point 552a of the PCB 530) may be an electrical length of a radiator that is operated as a multi-loop antenna. The electronic device 501 may transmit and receive a frequency signal of a high frequency band through the first route.

According to various embodiments, a second route may be formed at the first point 510a of the electronic device 501 along direction b to form a resonance. If a distance between the first point 510a and the third point 510c in direction b becomes longer, a frequency signal of a relatively low frequency band may be transmitted and received. According to various embodiments, in the electronic device 501, the length of a second route (a route that, starting from a feeding point 551a of the PCB 530, includes a first conductive member 551, a radiator 512 of the outer housing 510, a third point 510c, a third conductive member 553, and a ground point 553a of the PCB 530) may be an electrical length of a radiator that is operated as a multi-loop antenna. The electronic device 501 may transmit and receive a frequency signal of a low frequency band through the second route. As another example, if the distance is shorter, a frequency single of a relatively high frequency band may be transmitted and received.

The display 520 according to various embodiments may be connected to the ground part 554a of the PCB 530 through the fourth conductive member 554 (a second electrical path) and a ground point 554b of the display 520. The connection may prevent the adjacent display 520 from acting as an electric wave interrupting factor in an operation of transmitting and receiving a signal to and from the PCB 530.

According to various embodiments, referring to FIG. 5B, the electronic device 502 may have a form in which the display 520 is closer to the outer housing 510 (or the first conductive structure), unlike in FIG. 5A. In order to guarantee the portability of the wearable device, the entire thickness of the electronic device 502 may be smaller and a distance between the first conductive structure and the display 520 may be shorter.

For example, the first conductive structure (a conductive material part of the outer housing) 510 may be formed in a side wall of the electronic device 101, and may have a height that is the same as or similar to that of the display 520 in a forward direction (direction a) of the electronic device 101. The first conductive structure may surround the display 520.

According to various embodiments, the electronic device 502 may have operational characteristic similar to those of the electronic device 501 of FIG. 5A, but may show different resonance characteristics in some bands. The electronic device 502 may be designed to transmit and receive signals of a necessary frequency band by adjusting a distance between the first conductive structure and the display 520, a location of the ground part, or the like.

According to various embodiments, referring to FIG. 5C, in the electronic device 503, the second point 510b and the third point 510c of the outer housing 510 may be connected to a ground area (or a ground member) of the display 520, unlike in the electronic device 501 or 502. The second conductive member 552 may connect the second point 510b and a ground connecting point 552b of the display 520 (a first electrical path). The third conductive member 553 may connect the third point 510c and a ground connecting point 553b of the display 520 (a third electrical path). The electronic device 503 may have resonance characteristics that are similar to those of the electronic device 501 or the electronic device 502, but may show different resonance characteristics in some bands. Information on resonance characteristics of the electronic devices 501 to 503 may be provided through FIG. 5D.

Figure 5D:
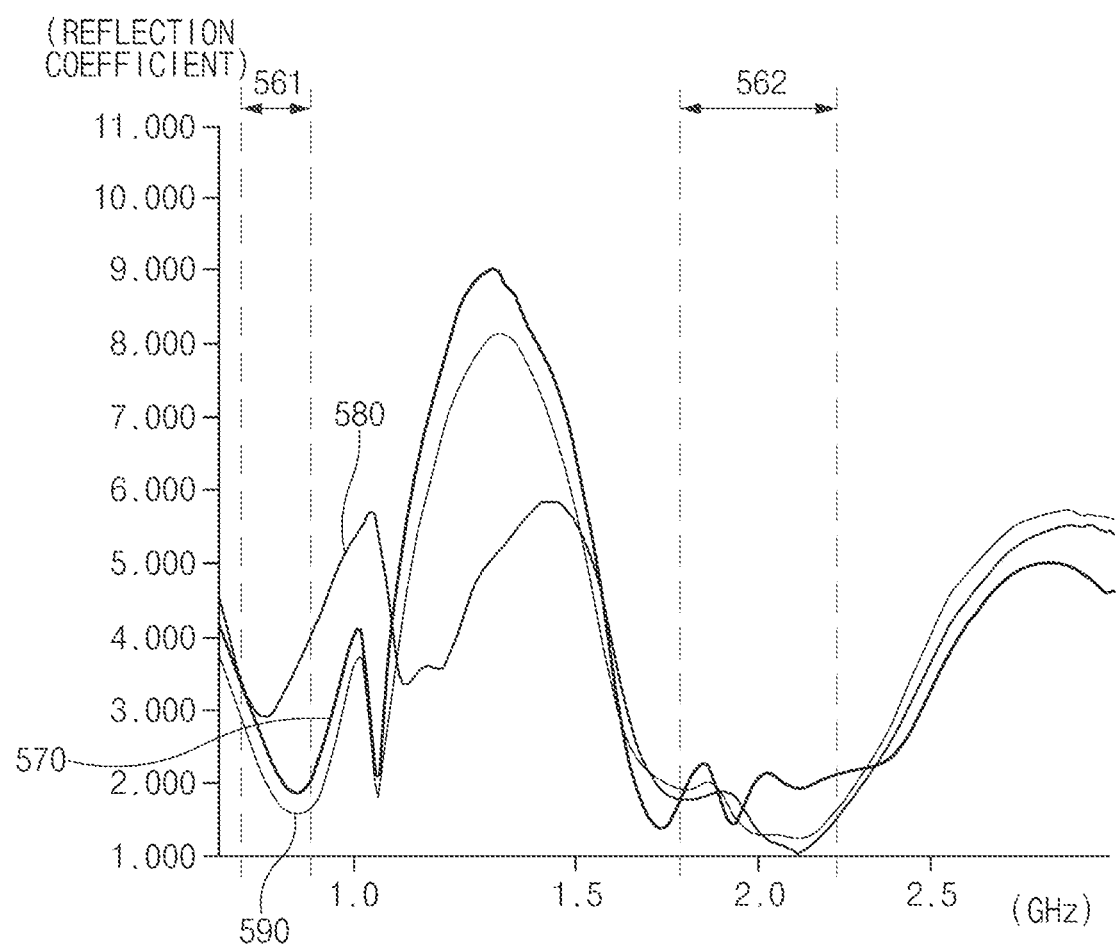
FIG. 5D is a graph depicting examples of operational characteristics of the electronic devices of FIGS. 5A, 5B, and 5C according to an embodiment of the present disclosure.

FIG. 5D is a graph depicting examples of operational characteristics of the electronic devices of FIGS. 5A, 5B, and 5C according to an embodiment of the present disclosure.

Referring to FIG. 5D, in the electronic devices 501 to 503, the locations of a feeder and a ground part may be the same. Meanwhile, operational characteristics of the electronic devices 501 to 503 may vary according to the type of a connected ground part (for example, a ground area of the display 520 or a ground part of the PCB 530) or a distance (or an arrangement form) between the first conductive structure included in the outer housing 510 and the display 520 at some frequency bands. According to various embodiments, the electronic devices 501 to 503 may transmit and receive signals of a first band 561 (for example, a band of 700 MHz to 900 MHz) and a second band 562 (for example, a band of 1600 MHz to 2400 MHz). The electronic devices 501 to 503 may be set such that the resonance characteristics thereof at the second band 562 that is a high frequency band are the same as or similar, and may be set such that resonance characteristics thereof at the first band 561 that is a low frequency band vary according to the type of the ground part, and a distance between the first conductive structure and the display 520. For example, when the electronic devices 501 to 503 correspond to the graphs 570 to 590, respectively, the electronic device 502 may transmit and receive signals of a frequency band that is lower than that of the electronic device 501 at the first band 561. A distance between the outer housing 510 (a first conductive structure included in the outer housing 510) and the display 520 of the electronic device 502 may be shorter than that of the electronic device 501. In the electronic device 502, a performance of the antenna of the outer housing 510 may deteriorate due to the approach of the display 520, and an influence by coupling may increase.

According to various embodiments, the electronic device 503 may transmit and receive frequency signals of a band that is higher than that of the electronic device 502, at the first band 561. Unlike in the electronic device 502, in the electronic device 503, a plurality of ground connectors having the first conductive structure may be connected to the display 520. In the electronic device 503, an electrical path is formed between the second conductive structure of the display 520 and the first conductive structure of the outer housing 510 so that a performance of the antenna may be improved and the electronic device 503 may show resonance characteristics that are the same as or similar to those of the electronic device 501.

Figure 6A:
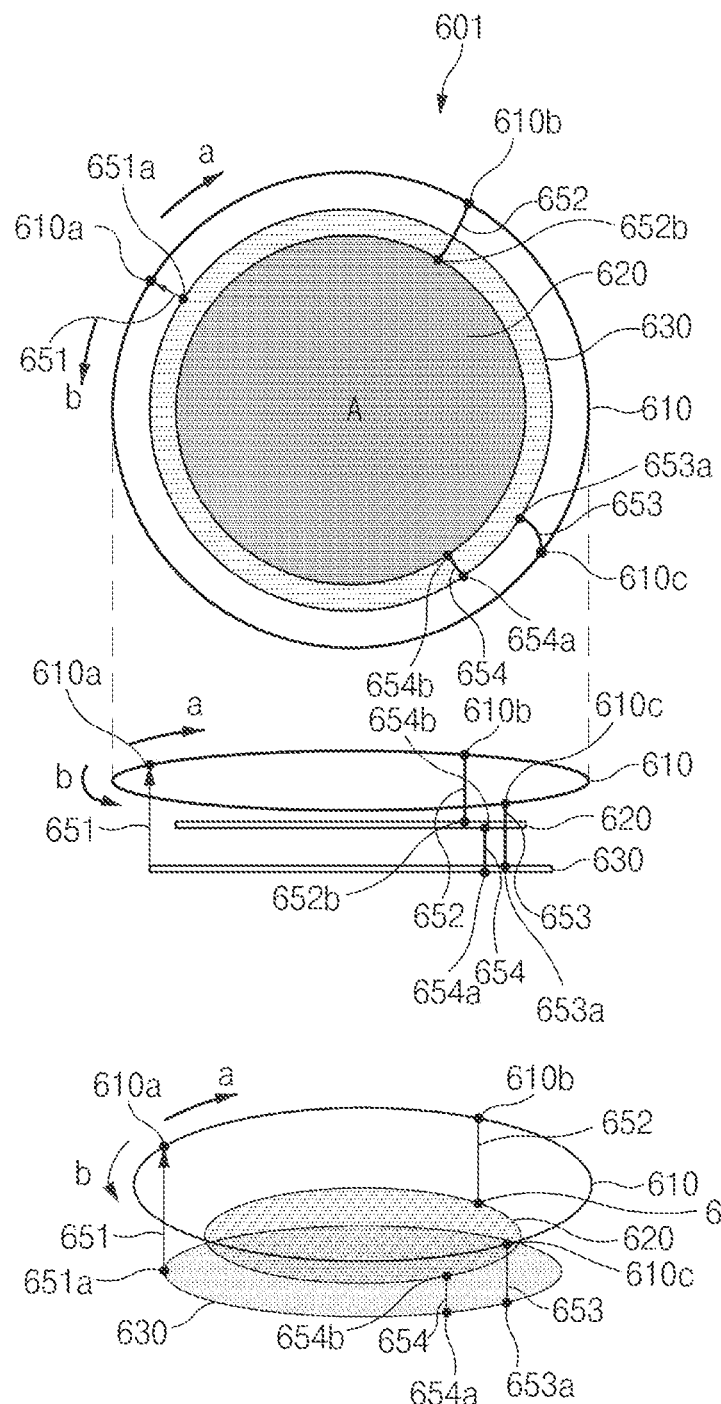
FIGS. 6A and 6B illustrate electronic devices in which outer housings are connected to different ground areas according to various embodiments of the present disclosure.
Figure 6B:
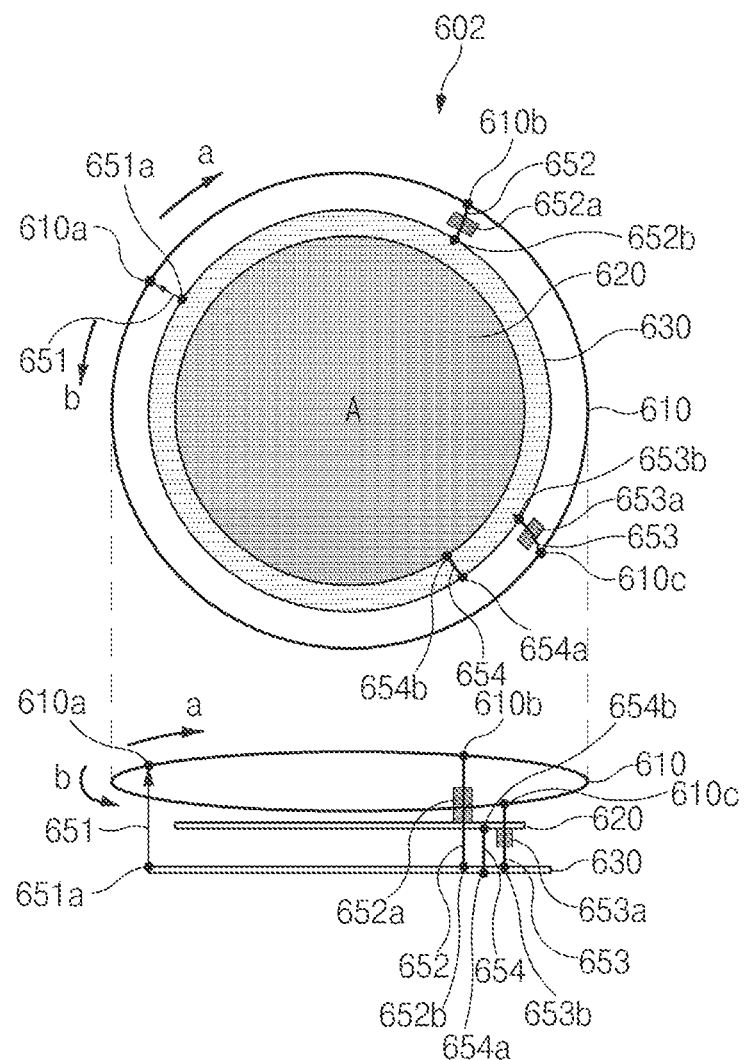

FIGS. 6A and 6B illustrate an electronic device in which outer housings are connected to different ground areas according to various embodiments of the present disclosure.

An electronic device 601 or 602 may be the electronic device 101 of FIG. 1.

Referring to FIG. 6A, the electronic device 601 may transmit and receive a multiband frequency signal by using one feeder and two ground parts. For example, in the electronic device 601, a radiator may be expanded in direction a (a direction from a first point 610*a* towards a second point 610*b*) and in direction b (a direction from the first point 610*a* towards a third point 610*c*) with respect to the feeding connector 610*a*. The electronic device 601 may generate a multi-loop resonance by using two connection paths that are connected to the second point 610*b* and the third point 610*c*.

According to various embodiments, the outer housing 610 may be connected to the feeder 651*a* of the PCB 630 through the first conductive member 651 at the first point (the feeding connector) 610*a*. According to various embodiments, the outer housing 610 may include a plurality of ground connectors (for example, the second point 610*b* and the third point 610*c*) connected to the ground part.

For example, the second point 610*b* may be connected to a ground connecting point 652*b* of the display 620 through the second conductive member 652 (a first electrical path), and may be connected to a ground part 654*a* of the PCB through a fourth conductive member 654 (a second electrical path). For example, the third point 610*c* may be connected to the ground part 653*a* of the PCB 630 through the third conductive member 653 (a fourth electrical path).

According to various embodiments, unlike in the electronic devices 501 to 503 of FIGS. 5A to 5C, in the electronic device 601, the second conductive member 652 and the third conductive member 653 may be connected to different types of ground parts (or ground areas). The second conductive member 652 may be connected to a ground connecting point 652*b* of the display 620, and the third conductive member 653 may be connected to a ground part 653*a* of the PCB 630. The resonance characteristics of the electronic device 601 may vary depending on the type of a ground connected to the plurality of ground connectors.

According to various embodiments, in the electronic device 601, the fourth conductive member 654 may connect a ground area (or a ground member) of the display 620 and a ground part of the PCB 630 (a second electrical path) to improve communication performance. The connection may prevent the adjacent display 620 from acting as an electric wave interrupting factor in a process of transmitting and receiving a signal to and from the PCB 630.

Referring to FIG. 6B, the frequency characteristics of the electronic device 602 may be adjusted by using components arranged around the display 620 or the PCB 630. In the electronic device 602, the second conductive member 652 and the third conductive member 653 may be replaced by ground parts (for example, FPCBs) of peripheral components (for example, a side key or a Hall IC) or may be connected to a ground part of a peripheral component. The second point 610*b* may be connected to the ground part 652*b* of the PCB 630 through a first component (for example, an FPCB connected to a side key) 652*a* or the third point 610*c* may be connected to the ground part 653*b* of the PCB 630 through a second component (for example, an FPCB on which a Hall IC is mounted) 653*a*.

According to various embodiments, in the electronic device 601, ground areas of peripheral components may be connected to each other to improve communication performance. The connection may prevent the adjacent peripheral component from acting as an electric wave interrupting factor in a process of transmitting and receiving a signal to and from the PCB 630.

Figure 6C:
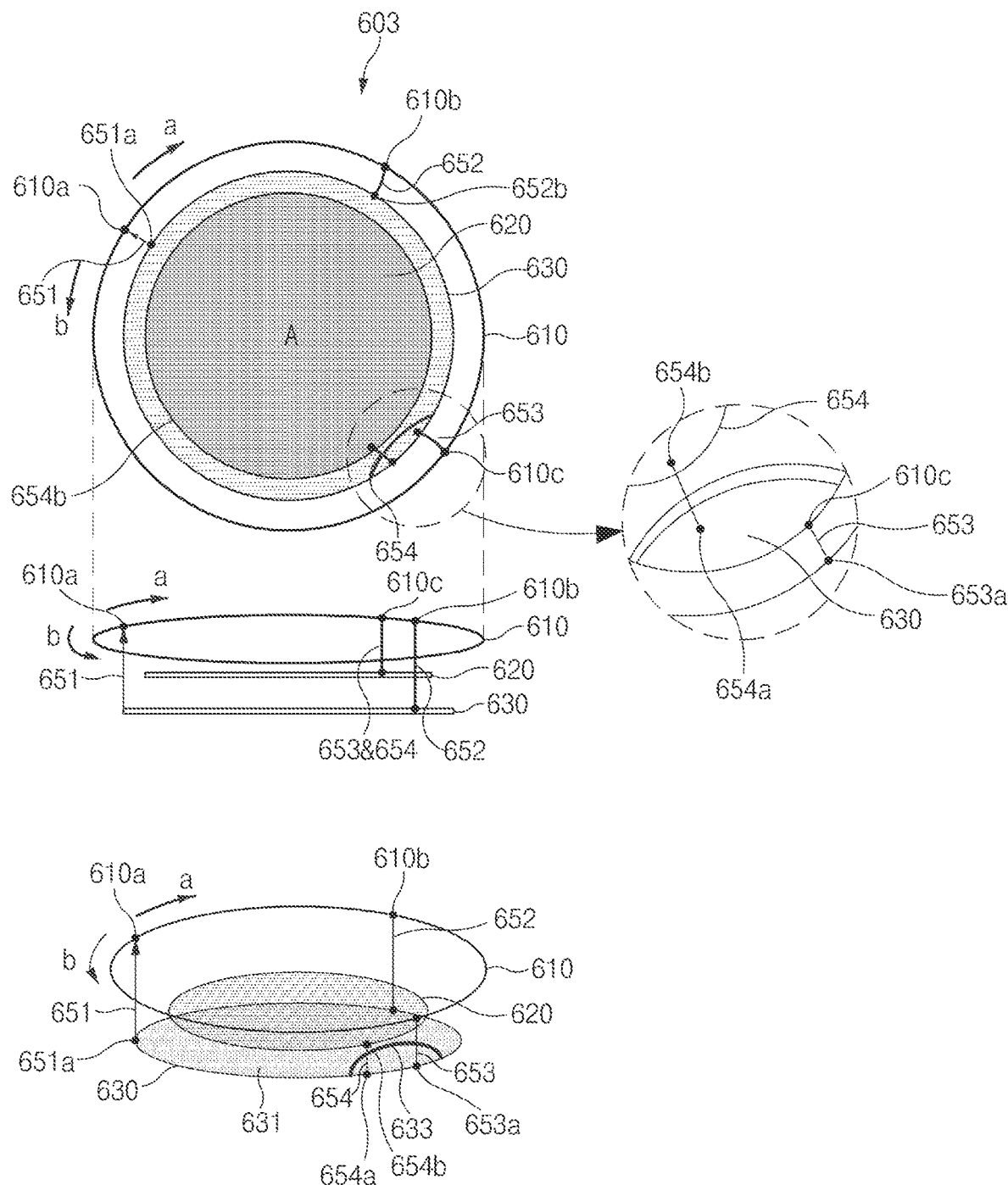
FIGS. 6C and 6D are diagrams of an electronic device including a printed circuit board (PCB) having an isolation area according to various embodiments of the present disclosure.
Figure 6D:
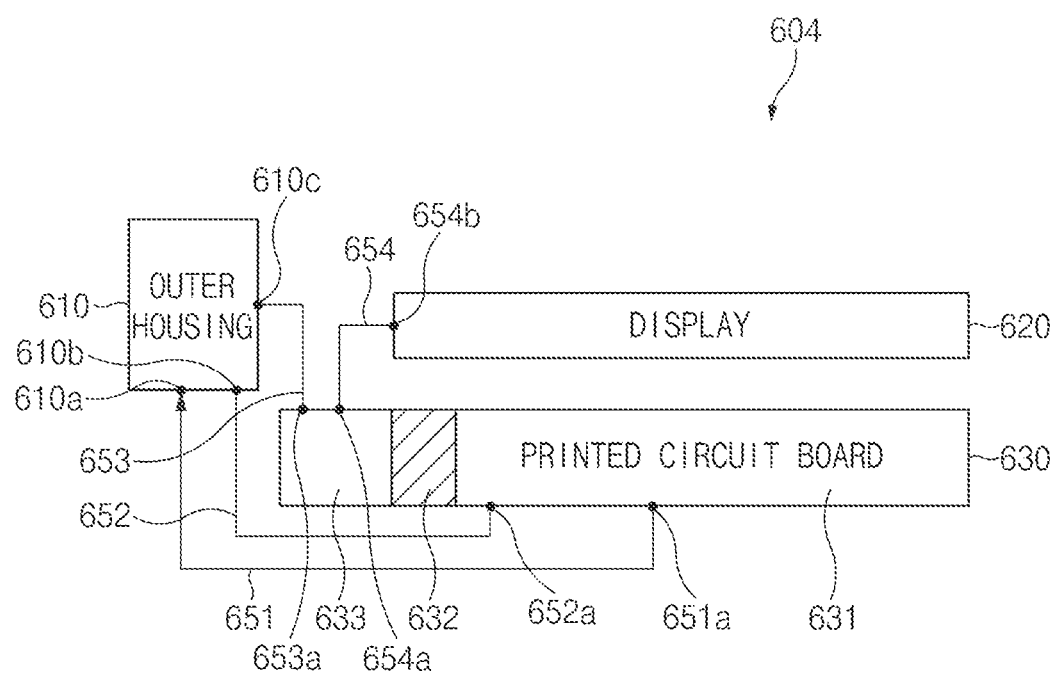

FIGS. 6C and 6D are diagrams of an electronic device including a PCB having an isolation area according to various embodiments of the present disclosure.

Referring to FIG. 6C, an electronic device 603 may include an outer housing 610, a display 620, and a PCB 630.

According to various embodiments, the outer housing 610 may be connected to the feeder 651*a* of the PCB 630 at the first point 610*a* and may be connected to the ground part 652*b* of the PCB at the second point 610*b*. In various embodiments, the outer housing 610 may be connected to the ground connecting point 654*b* of the display 620 (or the second conductive structure in the interior of the display 620) through the isolation area 633 of the PCB 630 at the third point 610*c*.

According to various embodiments, the PCB 630 may include a general area 631, an insulation area 632, and an isolation area 633.

According to various embodiments, the general area 631 may be an area in which chips or modules are arranged. For example, the general area 631 may include a communication circuit, a control circuit, a feeder, and a ground part.

According to various embodiments, the insulation area 632 may be arranged between the general area 631 and the isolation area 633. The insulation area 632 may be implemented by an insulation material, and may electrically isolate the general area 631 and the isolation area 633.

According to various embodiments, the isolation area 633 is an area that is electrically isolated from the general area and may be implemented by a conductive material. In various embodiments, the isolation area 633 may be a conductive pattern formed on a surface of the PCB 630. For example, the isolation area 633 may be arranged in a part of the PCB, and may be a conductive pattern that is electrically isolated from a ground part (or a ground member) of the general area 631. In various embodiments, the isolation area 633 may indirectly connect the third point 610c of the outer housing 610 and the display 620. In this case, the display 620 may define a separate stub connected to the outer housing 610.

Referring to FIG. 6D, an electronic device 604 may include an outer housing 610, a display 620, and a PCB 630.

According to various embodiments, the outer housing 610 may be connected to the feeder 651a of the PCB 630 at the first point 610a and may be connected (a fourth electrical path) to the ground part 652a of the PCB 630 at the second point 610b. The feeder 651a and the ground part 652a of the PCB 630 may be included in the general area 631.

The display 620 may be connected to the outer housing 610 through the isolation area 633 (a first electrical path). The display 620 may be connected to the isolation area 633 through the fourth conductive member 654. The isolation area 633 of the PCB 630 may be connected to the outer housing 610 through a third conductive member 653.

Figure 6E:
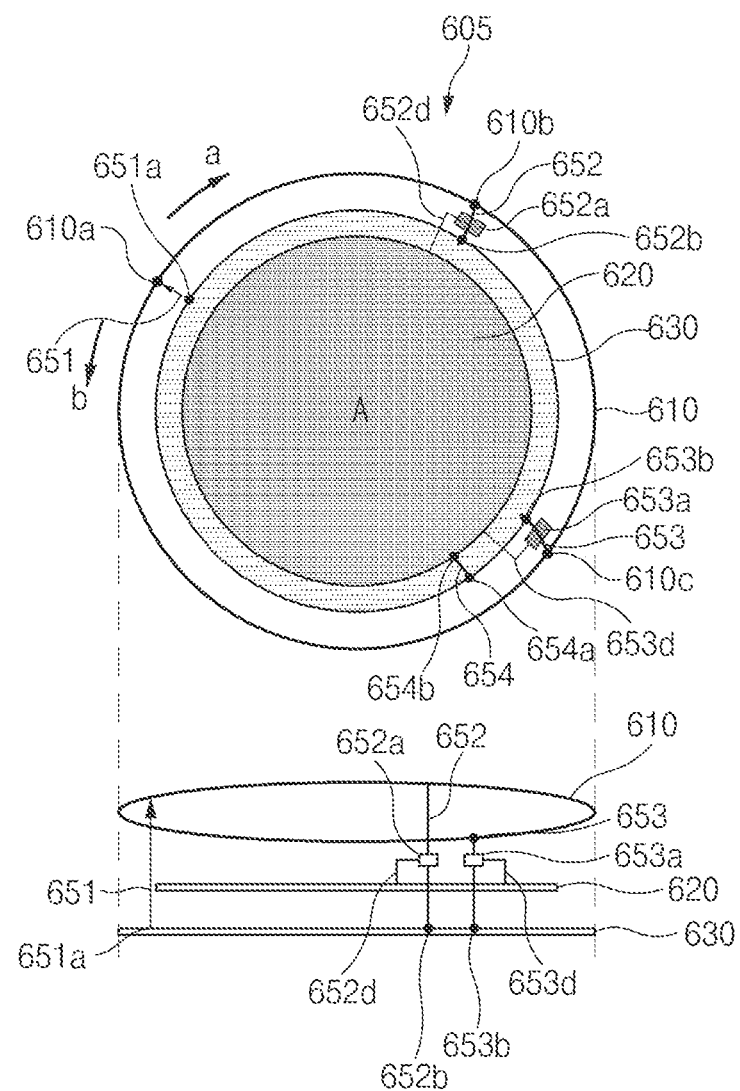
FIG. 6E illustrates a connection of a ground part using a peripheral component of a display according to an embodiment of the present disclosure.

FIG. 6E illustrates a connection of a ground part using a peripheral component of the display according to an embodiment of the present disclosure.

Referring to FIG. 6E, frequency characteristics of an electronic device 605 may be adjusted by using an FPCB 652a or 653a of a component (for example, a side key or a Hall IC) arranged around the display 620 or the PCB 630.

In various embodiments, in the electronic device 605, the second conductive member 652 or the third conductive member 653 may be deformed to be connected to a ground area of the display 620.

For example, the second point 610b may be connected to an FPCB 652a of a first component through the second conductive member 652, and the FPCB 652a of the first component may be directly connected to the display 620 or connected to the display 620 by using a separate conductive pattern (for example, a resilient member) 652d.

As another example, the third point 610c may be connected to an FPCB 653a of a second component through the third conductive member 653, and the FPCB 653a of the second component may be directly connected to the display 620 or connected to the display 620 by using a separate conductive pattern (for example, a resilient member) 653d. Through this, deterioration of radiation of an antenna due to the display 620 may be reduced.

Figure 7A:
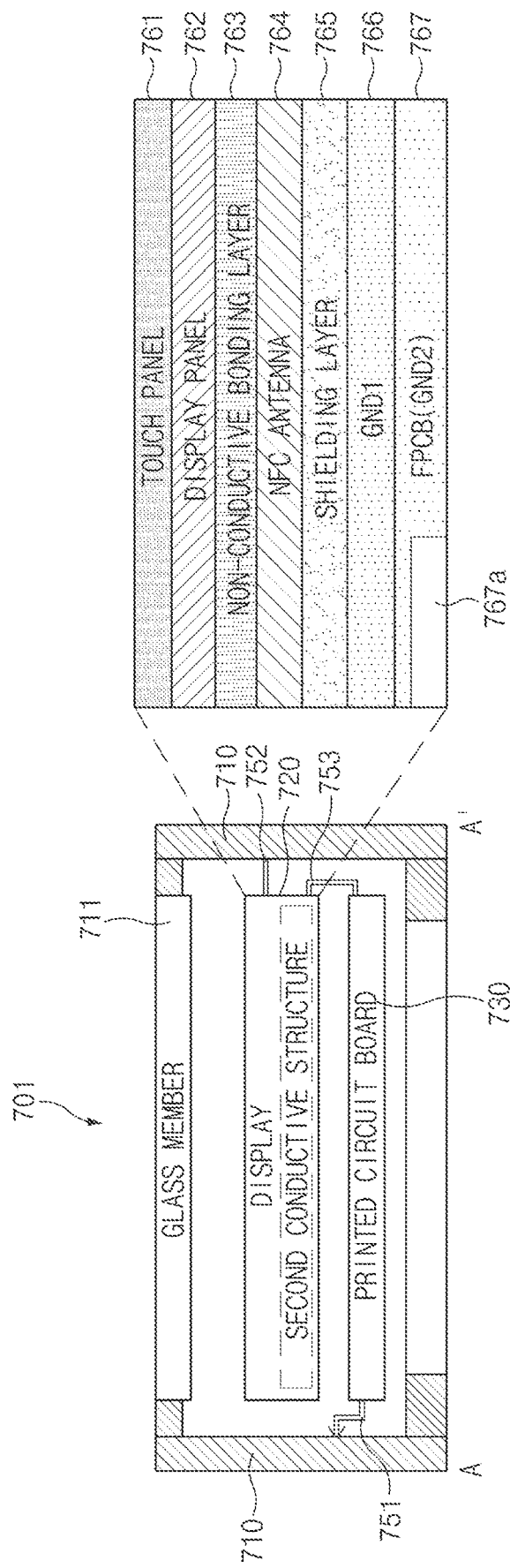
FIGS. 7A and 7B are sectional views of a display according to various embodiments of the present disclosure.
Figure 7B:
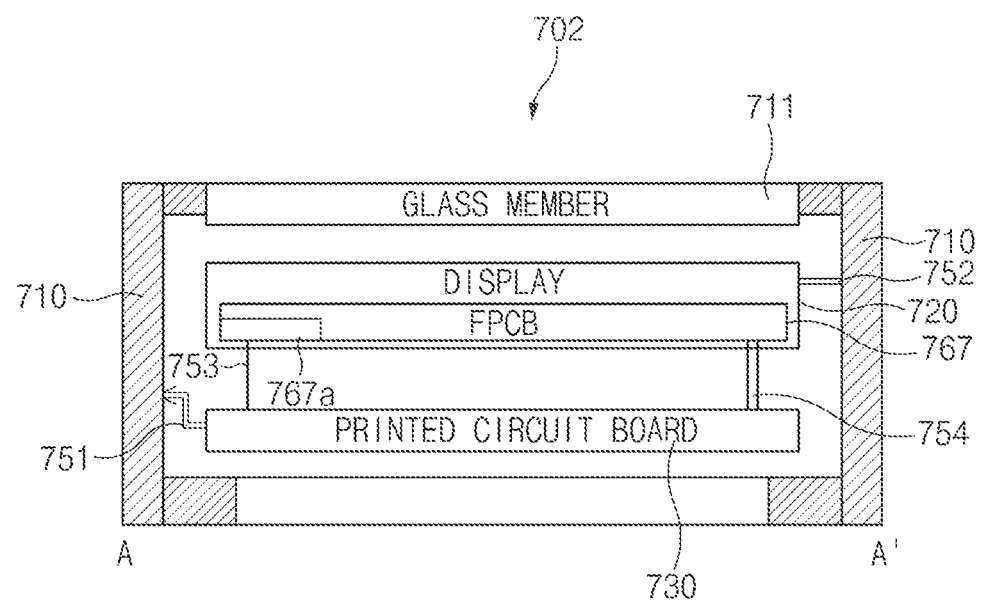

FIGS. 7A and 7B are sectional views of a display according to various embodiments of the present disclosure.

Referring to FIG. 7A, an electronic device 701 may include an outer housing 710, a glass member 711, a display 720, and a PCB 730. The outer housing 710 may be connected to a feeder of the PCB 730 through a first conductive member 751.

The outer housing 710 according to various embodiments may be connected to a ground part (or a ground member) formed in the display 720 or the PCB 730 through a second conductive member 752. Although FIG. 7A illustrates that the second conductive member 752 is connected to the display 720, the present disclosure is not limited thereto. For example, the second conductive member 752 may be connected to a ground part of the PCB 730.

The display 720 may include at least some of a touch panel 761, a display panel 762, a non-conductive bonding layer 763, an NFC antenna 764, a shielding layer 765, a first ground layer (GND 1) 766, and an FPCB 767. In various embodiments, the display 720 may be implemented by a one cell TSP AMOLED (OCTA) in which a touch panel and an AMOLED panel are integrally coupled to each other.

According to various embodiments, the touch panel 761 may detect a touch input (or a touch pen input) of the user. For example, the touch panel 761 may provide a change of a signal (for example, a change in capacitance) due to a touch input to the PCB 730. In various embodiments, the touch panel 761 may include a touch signal line directly connected to the PCB 730.

The display 762 according to various embodiments may output an image or a text. For example, the display panel 762 may be connected to an FPCB 767 through a signal line that transmits and receives data.

According to various embodiments, the non-conductive bonding layer 763 may be arranged between the display panel 762 and an NFC antenna layer 764, and may be implemented by a non-conductive material.

According to various embodiments, the NFC antenna layer 764 may include an NFC coil and an NFC signal line connected to the coil. The NFC coil may transmit and receive an NFC related signal, and the NFC signal line may provide the signal to the PCB 730.

According to various embodiments, the shielding layer 765 may interrupt an influence of electromagnetic waves that may be generated in the NFC antenna layer 764.

According to various embodiments, the first ground layer (GND 1) 766 may be connected to a metallic element (for example, a driver chip) included in the display 720 to form a ground part that is necessary for driving the display 720.

According to various embodiments, modules or chips that are necessary for driving the display panel 762 may be mounted on the FPCB 767. In various embodiments, the FPCB 770 may be operated as a ground area (GND 2).

According to various embodiments, a third ground layer (GND 3) (not illustrated) may be further included between the display 720 and the PCB 730, and the third ground layer may be a shielding layer or a heat dissipating layer that is implemented by stainless steel. For example, the third ground layer (GND 3) may interrupt electromagnetic waves or heat that may be generated by the PCB 730.

According to various embodiments, the touch panel (GND 0) 761, the first ground layer (GND 1) 762, and the FPCB 767 may be connected to at least one ground connector by which the first conductive structure included in the outer housing 710 acts as a multiband antenna. Further, the touch panel (GND 0) 761, the first ground layer (GND 1) 762, the FPCB 767 may be connected to a ground part of the PCB 730 to improve communication performance.

Referring to FIG. 7B, the electronic device 702 may include an outer housing 710, a glass member 711, a display 720, and a PCB 730. The display 720 may have a stack structure, and may include an FPCB layer 767.

According to various embodiments, modules or chips that are necessary for driving the display panel 720 may be mounted on the FPCB 767. The FPCB 767 may be connected to a display module or a circuit that is mounted on the PCB 730 through a signal line 754. For example, the signal line 754 may transmit and receive a signal related to an output of an image. According to various embodiments, the FPCB 767 may be connected to a ground part of the PCB 740 to be operated as a ground part.

In various embodiments, the FPCB 767 may include a ground part 767a that are separately formed. The ground part 767a may be a conductive area that is isolated from an area to which the chips and module of the FPCB are attached. In various embodiments, the ground part 767a may be connected to a ground part (or a ground area) formed in the PCB 730 through a third conductive member 753. In various embodiments, the ground part 767a may be a conductive tape that is attached to the FPCB 767.

Figure 8:
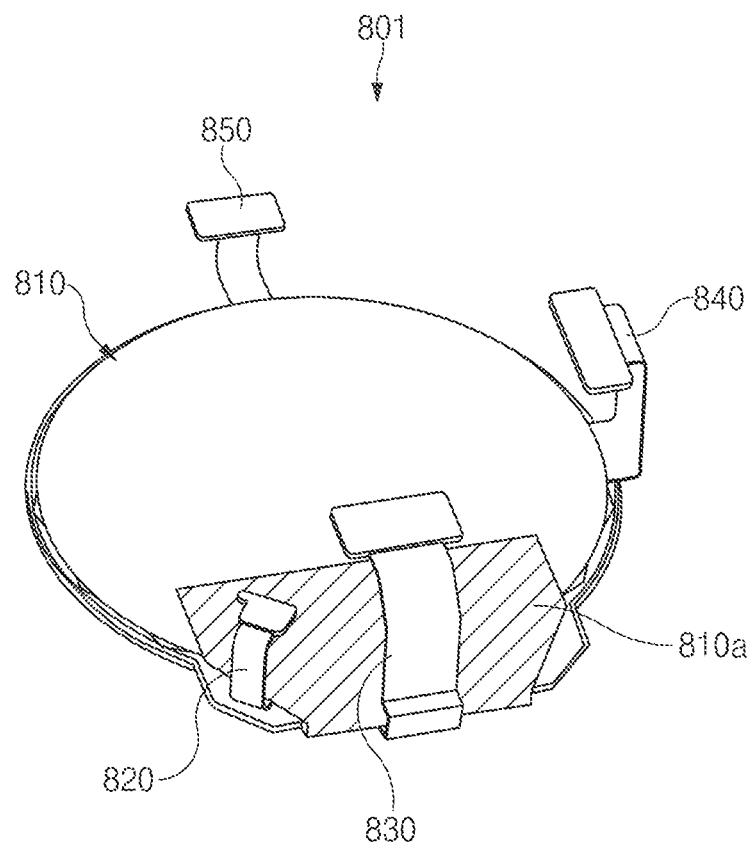
FIG. 8 is a view of a display device according to an embodiment of the present disclosure.

FIG. 8 is a view of a display according to an embodiment of the present disclosure.

Referring to FIG. 8, a display 801 may include a stack structure 810 and tail-shaped signal lines 820 to 850.

According to various embodiments, the stack structure 810 may have a form in which a touch panel, a display panel, and the like are stacked as in FIG. 7.

According to various embodiments, the stack structure 810 may include a ground part 810a. The ground part 810a may be the ground part 767a of FIG. 7B. The ground part 810a may be connected to a ground part formed in the PCB. In various embodiments, the ground part 810a may be a metal plate that is arranged under the display panel. The ground part 810a may define at least a portion of the second conductive structure. The ground part 810a may at least partially interrupt an electric field that is generated from at least a portion of the PCB or at least partially disperse heat generated in the interior of the display.

According to various embodiments, the signal lines 820 to 850 may have a tail-shaped structure that is to be connected to the PCB or the outer housing in each of the layers included in the stack structure 810.

According to various embodiments, the signal line 820 may be a signal line that is connected to a ground layer of the display. The signal line 820 may be connected to a ground part of the PCB or connected to the outer housing through a separate conductive member.

According to various embodiments, the signal line 830 may be a signal line that is connected to a touch panel, and the signal line 840 may be a signal line that is connected to an FPCB for driving a side key. The signal line 850 may be a signal line that is connected to an FPCB for driving the display panel.

Figure 9:
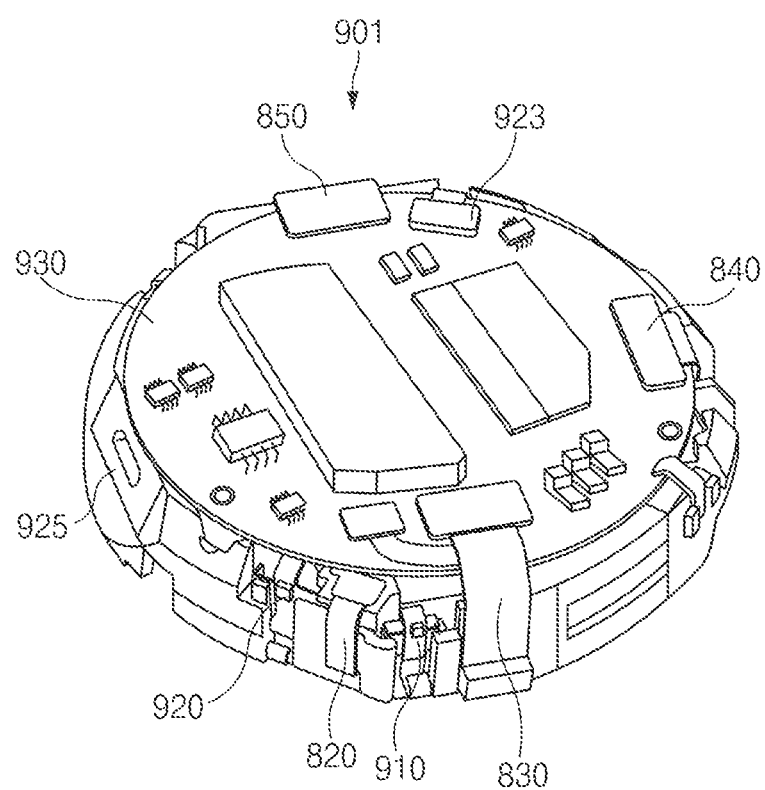
FIG. 9 illustrates an internal configuration of an electronic device according to an embodiment of the present disclosure.

FIG. 9 illustrates an internal configuration of an electronic device according to an embodiment of the present disclosure.

Referring to FIG. 9, an electronic device 901 may include a bracket 925 and a PCB 930.

A display (for example, the display 160 of FIG. 1) may be mounted on the bracket 925. According to various embodiments, the bracket 925 may fix signal lines 820 to 850 connected to the display, and may allow the signal lines 820 to 850 to be stably connected to the PCB 930.

According to various embodiments, a conductive member 910 may be mounted on the bracket 925. The conductive member 910 may have a resilient structure, and may connect the outer housing, the display, and the PCB 930. For example, the conductive member 910 may be a conductive member that connects a ground part of the PCB 930 or a ground part of the display to the outer housing.

According to various embodiments, the conductive member 920 may connect the outer housing and a ground part of the PCB 930. The conductive member 920 may have a resilient structure. When the outer housing is coupled, the conductive member 920 may resiliently connect the outer housing and a ground part of the PCB.

According to various embodiments, the conductive member 923 may be a conductive member that connects a feeder of the PCB and the outer housing.

According to various embodiments, the signal line 820 may be a signal line that is connected to a ground layer of the display. The signal line 820 may be connected to a ground part arranged on one surface of the PCB 930.

According to various embodiments, the signal line 830 may be a signal line that is connected to a touch panel.

According to various embodiments, the signal line 840 may be a signal line that is connected to an FPCB for driving a side key. In various embodiments, the signal line 840 may be connected to the outer housing.

According to various embodiments, the signal line 850 may be a signal line that is connected to an FPCB for driving the display panel. The FPCB may define at least a portion of the second conductive structure.

Figure 10:
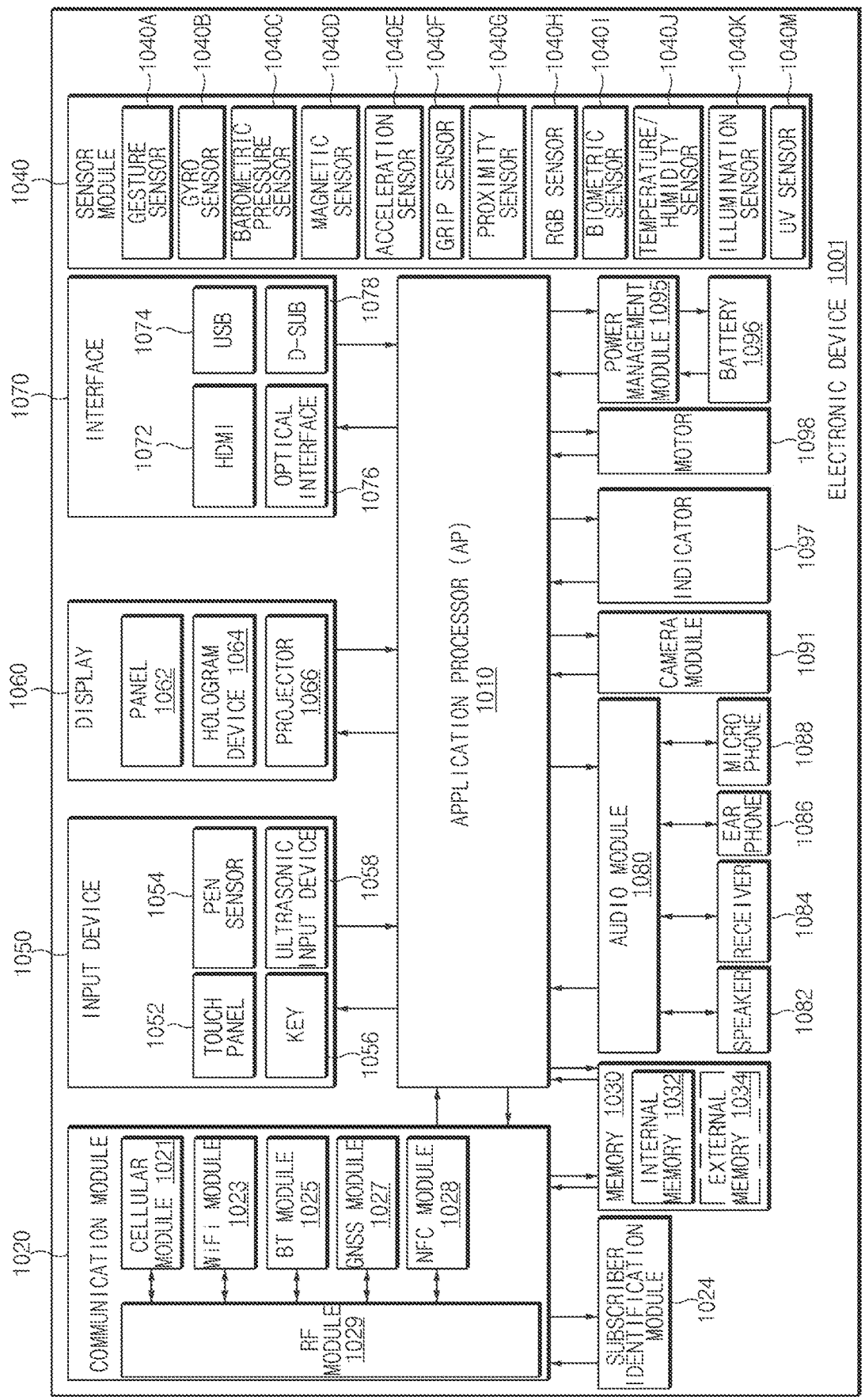
FIG. 10 is a block diagram of an electronic device according to an embodiment of the present disclosure.

FIG. 10 is a block diagram of an electronic device according to an embodiment of the present disclosure.

Referring to FIG. 10, an electronic device 1001 may include, for example, all or a part of the electronic device 101 illustrated in FIG. 1. The electronic device 1001 may include one or more processors (e.g., an AP) 1010, a communication module 1020, a subscriber identification module 1024, a memory 1030, a sensor module 1040, an input device 1050, a display 1060, an interface 1070, an audio module 1080, a camera module 1091, a power management module 1095, a battery 1096, an indicator 1097, and a motor 1098. The processor 1010 may drive an OS or an application to control a plurality of hardware or software elements connected to the processor 1010 and may process and compute a variety of data. The processor 1010 may be implemented with a system on chip (SoC), for example. According to an embodiment, the processor 1010 may further include a graphic processing unit (GPU) and/or an image signal processor (ISP). The processor 1010 may include at least a part (e.g., a cellular module 1021) of elements illustrated in FIG. 10. The processor 1010 may load and process an instruction or data, which is received from at least one of other elements (e.g., a nonvolatile memory) and may store a variety of data in a nonvolatile memory.

The communication module 1020 may be configured the same as or similar to the communication interface 170 of FIG. 1. The communication module 1020 may include a cellular module 1021, a Wi-Fi module 1023, a BT module 1025, a GNSS module 1027 (e.g., a GPS module, a Glonass module, a Beidou module, or a Galileo module), a NFC module 1028, and a radio frequency (RF) module 1029.

The cellular module 1021 may provide voice communication, video communication, a message service, an Internet service or the like through a communication network. According to an embodiment, the cellular module 1021 may perform discrimination and authentication of the electronic device 1001 within a communication network using the subscriber identification module (SIM) 1024 (e.g., a SIM card), for example. According to an embodiment, the cellular module 1021 may perform at least a portion of functions that the processor 1010 provides. According to an embodiment, the cellular module 1021 may include a CP.

Each of the Wi-Fi module 1023, the BT module 1025, the GNSS module 1027, and the NFC module 1028 may include a processor for processing data exchanged through a corresponding module, for example. According to an embodiment, at least a part (e.g., two or more elements) of the cellular module 1021, the Wi-Fi module 1023, the BT module 1025, the GNSS module 1027, or the NFC module 1028 may be included within one Integrated Circuit (IC) or an IC package.

The RF module 1029 may transmit and receive, for example, a communication signal (e.g., an RF signal). The RF module 1029 may include, for example, a transceiver, a power amplifier module (PAM), a frequency filter, a low noise amplifier (LNA), an antenna, or the like. According to another embodiment, at least one of the cellular module 1021, the Wi-Fi module 1023, the BT module 1025, the GNSS module 1027, or the NFC module 1028 may transmit and receive an RF signal through a separate RF module.

The subscriber identification module 1024 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1030 (e.g., the memory 130) may include an internal memory 1032 or an external memory 1034. For example, the internal memory 1032 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 1034 may include a flash drive, for example, compact flash (CF), secure digital (SD), micro-SD, mini-SD, extreme digital (xD), multimedia card (MMC), a memory stick, or the like. The external memory 1034 may be functionally and/or physically connected with the electronic device 1001 through various interfaces.

The sensor module 1040 may measure, for example, a physical quantity or may detect an operation state of the electronic device 1001. The sensor module 1040 may convert the measured or detected information to an electric signal. The sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., red, green, blue (RGB) sensor), a biometric sensor 1040I, a temperature/humidity sensor 1040J, an illuminance sensor 1040K, or an UV sensor 1040M. Even though not illustrated, additionally or alternatively, the sensor module 1040 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 1040 may further include a control circuit for controlling at least one or more sensors included therein. According to an embodiment, the electronic device 1001 may further include a processor which is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input unit 1058. The touch panel 1052 may use at least one of capacitive, resistive, infrared and ultrasonic detecting methods. Also, the touch panel 1052 may further include a control circuit. The touch panel 1052 may further include a tactile layer to provide a tactile reaction to a user.

The (digital) pen sensor 1054 may be, for example, a portion of a touch panel or may include an additional sheet for recognition. The key 1056 may include, for example, a physical button, an optical key, a keypad, or the like. The ultrasonic input device 1058 may detect (or sense) an ultrasonic signal, which is generated from an input device, through a microphone (e.g., a microphone 1088) and may check data corresponding to the detected ultrasonic signal.

The display 1060 (e.g., the display 160) may include a panel 1062, a hologram device 1064, or a projector 1066. The panel 1062 may be configured the same as or similar to the display 160 of FIG. 1. The panel 1062 may be implemented to be flexible, transparent or wearable, for example. The panel 1062 and the touch panel 1052 may be integrated into a single module. The hologram device 1064 may display a stereoscopic image in a space using a light interference phenomenon. The projector 1066 may project light onto a screen so as to display an image. The screen may be arranged inside or outside the electronic device 1001. According to an embodiment, the display 1060 may further include a control circuit for controlling the panel 1062, the hologram device 1064, or the projector 1066.

The interface 1070 may include, for example, a HDMI 1072, a USB 1074, an optical interface 1076, or a D-sub-miniature (D-sub) 1078. The interface 1070 may be included, for example, in the communication interface 170 illustrated in FIG. 1. Additionally or alternatively, the interface 1070 may include, for example, a mobile high definition link (MHL) interface, a SD card/multi-media card (MMC) interface, or an infrared data association (IrDA) standard interface.

The audio module 1080 may convert a sound and an electrical signal in dual directions. At least a part of the audio module 1080 may be included, for example, in the input/output interface 150 illustrated in FIG. 1. The audio module 1080 may process, for example, sound information that is input or output through a speaker 1082, a receiver 1084, an earphone 1086, or a microphone 1088.

The camera module 1091 for shooting a still image or a video may include, for example, at least one image sensor (e.g., a front sensor or a rear sensor), a lens, an ISP, or a flash (e.g., an LED or a xenon lamp).

The power management module 1095 may manage, for example, power of the electronic device 1001. According to an embodiment, a power management integrated circuit (PMIC) a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1096 and a voltage, current or temperature thereof while the battery is charged. The battery 1096 may include, for example, a rechargeable battery or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate a vibration effect, a haptic effect, or the like. Even though not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), MediaFlo™, or the like.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

According to various embodiments, an electronic device includes an outer housing that comprises a first surface that faces a first direction, a second surface that faces a second direction opposite to the first direction, and a side surface that surrounds a space between the first surface and the second surface, a display at least a portion of which is exposed through the first surface of the outer housing, a PCB that is arranged between the second surface and the display in the interior of the outer housing, a communication circuit that is arranged on or over the PCB, a first conductive structure that defines the first surface and/or at least a portion of the side surface and that is electrically connected to the communication circuit, and a second conductive structure that defines a portion of the display and that is electrically connected to the first conductive structure.

According to various embodiments, the electronic device further includes a first electrical path that electrically connects the first conductive structure and the second conductive structure. The electronic device further includes a ground member that is arranged at a portion of the PCB, and a second electrical path that electrically connects the second conductive structure and the ground member. The electronic device further includes a control circuit that is electrically connected to the communication circuit, wherein the control circuit transmits and receives signals of a first frequency band to and from an external device by using the communication circuit and the first electrical path, and transmits and receives signals of a second frequency band to and from the external device by using the communication circuit and the second electrical path.

According to various embodiments, the PCB is arranged at least at another portion of the PCB and comprises a conductive material that is electrically isolated from the ground member, and the first electrical path comprises the conductive pattern.

According to various embodiments, the electronic device further includes a third electrical path that electrically connects the first conductive structure and the second conductive structure.

According to various embodiments, the electronic device further includes a fourth electrical path that electrically connects the first conductive structure and at least a portion of the PCB.

According to various embodiments, the display includes a first area in which a screen is displayed, and a second area in which a screen is not displayed, and the second conductive structure is arranged in the second area. The display includes a FPCB, and at least a portion of the second conductive structure is arranged in the FPCB.

According to various embodiments, the display includes a display panel, and a metal plate arranged under the display panel, and wherein the metal plate defines at least a portion of the second conductive structure. The metal plate at least partially interrupts an electromagnetic field that is generated from at least a portion of the PCB and faces the display panel, or at least partially disperses heat generated in the interior of the display.

According to various embodiments, the electronic device further includes a binding structure that is connected to at least a portion of the outer housing and that is detachably mounted on a part of a body of the user.

According to various embodiments, the display device is circular when viewed from the top of the outer housing.

According to various embodiments, the electronic device includes an outer housing that comprises a first conductive structure, a display at least a portion of which is exposed through the first surface of the outer housing and a PCB that is electrically connected to the display, wherein the first conductive structure comprises a feeding connector that is connected to a feeder of the PCB, and at least one ground connector that is connected to a ground part of the PCB or a ground part of the display. The first conductive structure is operated as a radiator of a multiband antenna. The first conductive structure defines a first surface of the outer housing and/or at least a portion of the side surface. The first conductive structure defines at least a portion of a peripheral area that is adjacent to a through-hole of the outer housing.

According to various embodiments, the PCB has a size, a form, or an area that corresponds to a size, a form, or an area of the display.

According to various embodiments, the display includes a second conductive structure, and the second conductive structure is electrically connected to the ground part of the PCB. The display includes a first area in which a screen is displayed, and a second area in which a screen is not displayed, and the second conductive structure is arranged in the second area. The display includes a FPCB, and at least a portion of the second conductive structure is arranged on the FPCB.

According to various embodiments, the display includes a display panel, and a metal plate arranged under the display panel, and wherein the metal plate defines at least a portion of the second conductive structure. The metal plate at least partially interrupts an electromagnetic field that is generated from at least a portion of the PCB and faces the display panel, or at least partially disperses heat generated in the interior of the display.

According to various embodiments, the feeding connector or a plurality of ground connectors are connected to the PCB or the display through a conductive member having a resilient structure.

According to various embodiments, the at least one ground connector includes a first ground connector and a second ground connector, wherein the first ground connector is connected to a ground part of the PCB, and the second ground connector is connected to a ground part of the display.

According to various embodiments, the at least one ground connector is connected to a ground part of a peripheral component that is arranged adjacent to the PCB or the display. The ground part of the peripheral component is connected to the ground part of the PCB or the ground part of the display.

According to various embodiments, the first conductive structure is formed at a periphery of a through-hole through which the display is exposed.

According to various embodiments, the first conductive structure is a resilient structure.

The electronic device according to various embodiments of the present disclosure can implement a multiband antenna by using a conductive structure (for example, a metal) formed on an outer side of the device.

Further, the electronic device according to various embodiments of the present disclosure can improve the performance of an antenna and prevent electric waves from being interrupted by the display device, by utilizing a ground area of a display as a ground area of an antenna.

The electronic device according to various embodiments of the present disclosure can tune an antenna having various resonance characteristics by using a ground area of a display.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable electronic device comprising:
   a housing forming at least one portion of a side surface of the wearable electronic device, the at least one portion including a conductive structure;
   a display accommodated in the housing;
   a flexible printed circuit board electrically connected to the display and including a conductive area; and
   a printed circuit board disposed between the flexible printed circuit board and a rear surface of the wearable electronic device,
   wherein the printed circuit board includes a communication circuitry electrically connected with the conductive structure and the conductive area such that the conductive structure and the conductive area together are to be operated as at least part of an antenna of the wearable electronic device with respect to at least two frequency bands.

2. The wearable electronic device of claim 1, further comprising:
   a first conductive member connected with the printed circuit board,
   wherein the communication circuitry is electrically connected with the conductive structure via the first conductive member.

3. The wearable electronic device of claim 1,
   wherein the flexible printed circuit board includes a metal portion forming at least one portion of a ground structure, and
   wherein the conductive structure is electrically connected with the metal portion.

4. The wearable electronic device of claim 1, further comprising:
   a second conductive member connected with the printed circuit board,
   wherein the communication circuitry is electrically connected with the conductive area via the second conductive member.

5. The wearable electronic device of claim 1,
   wherein the printed circuit board includes a metal portion forming at least one portion of a ground structure, and
   wherein the conductive area is electrically connected with the metal portion.

6. The wearable electronic device of claim 1, further comprising:
   a resilient structure,
   wherein the communication circuitry is electrically connected with the conductive structure via the resilient structure.

7. The wearable electronic device of claim 1, further comprising:
   a resilient structure,
   wherein the conductive area is electrically connected with the printed circuit board via the resilient structure.

8. The wearable electronic device of claim 1, wherein the conductive area for operating as the part of the antenna is adapted to operate on a near field communication (NFC) frequency, or a cellular frequency.

9. The wearable electronic device of claim 1, wherein the printed circuit board is separated from the flexible printed circuit board by a material layer formed therebetween.

10. The wearable electronic device of claim 1, wherein the at least two frequency bands include a low frequency band and a high frequency band.

11. The wearable electronic device of claim 10, wherein the antenna is configured to transmit and receive a signal of the low frequency band based on a first distance between connection points that electrically connect the conductive structure and the conductive area.

12. The wearable electronic device of claim 11, wherein the antenna is configured to transmit and receive a signal of the high frequency band based on a second distance between the connection points for electrically connecting the conductive structure and the conductive area.

13. The wearable electronic device of claim 12, wherein the first distance is greater than the second distance.

14. The wearable electronic device of claim 1, wherein the flexible printed circuit board transmits image data to the display.

15. A wearable electronic device comprising:
    an outer housing including a first conductive structure;
    a display including a display panel and a flexible printed circuit board, wherein the flexible printed circuit board electrically connected to the display panel and including a conductive area; and
    a printed circuit board disposed between the flexible printed circuit board and a rear surface of the wearable electronic device,
    wherein the printed circuit board includes a communication circuitry electrically connected with the conductive structure and the conductive area such that the conductive structure and the conductive area together are to be operated as at least part of an antenna of the wearable electronic device with respect to at least two frequency bands.

16. The wearable electronic device of claim 15, further comprising:
    a first conductive member connected with the printed circuit board,
    wherein the communication circuitry is electrically connected with the conductive structure via the first conductive member.

17. The wearable electronic device of claim 15,
    wherein the flexible printed circuit board includes a metal portion forming at least one portion of a ground structure, and
    wherein the conductive structure is electrically connected with the metal portion.

18. The wearable electronic device of claim 15, further comprising:
    a second conductive member connected with the printed circuit board,
    wherein the communication circuitry is electrically connected with the conductive area via the second conductive member.

19. The wearable electronic device of claim 15,
    wherein the printed circuit board includes a metal portion forming at least one portion of a ground structure, and
    wherein the conductive area is electrically connected with the metal portion.

20. The wearable electronic device of claim 15, wherein the printed circuit board is separated from the flexible printed circuit board by a material layer formed therebetween.

* * * * *